US012659172B2

(12) United States Patent
Fukuda et al.

(10) Patent No.: US 12,659,172 B2
(45) Date of Patent: Jun. 16, 2026

(54) DIGITAL SIGNATURE SYSTEM, DIGITAL SIGNATURE METHOD

(71) Applicant: NEC Corporation, Tokyo (JP)

(72) Inventors: Haruna Fukuda, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 43 days.

(21) Appl. No.: 18/748,570

(22) Filed: Jun. 20, 2024

(65) Prior Publication Data

US 2024/0430101 A1 Dec. 26, 2024

(30) Foreign Application Priority Data

Jun. 22, 2023 (JP) ................................. 2023-102629

(51) Int. Cl.
*H04L 9/32* (2006.01)

(52) U.S. Cl.
CPC .......... *H04L 9/3247* (2013.01); *H04L 9/3231* (2013.01)

(58) Field of Classification Search
CPC .............................. H04L 9/3247; H04L 9/3231
See application file for complete search history.

(56) References Cited

U.S. PATENT DOCUMENTS

| | | | | |
|---|---|---|---|---|
| 2004/0111625 A1* | 6/2004 | Duffy | .................... | H04L 9/3231 |
| | | | | 713/186 |
| 2014/0019766 A1 | 1/2014 | Takahashi et al. | | |

| | | | | |
|---|---|---|---|---|
| 2016/0094348 A1* | 3/2016 | Takahashi | ............. | H04L 9/3231 |
| | | | | 713/176 |
| 2022/0029829 A1 | 1/2022 | Fukuda et al. | | |
| 2022/0038291 A1 | 2/2022 | Hong et al. | | |
| 2022/0405369 A1* | 12/2022 | Takahashi | ............. | H04L 9/0861 |
| 2025/0070985 A1* | 2/2025 | Fukuda | ................. | H04L 9/3231 |

FOREIGN PATENT DOCUMENTS

| | | |
|---|---|---|
| JP | 2015-039106 A | 2/2015 |
| JP | 5707311 B2 | 4/2015 |
| JP | 5907830 B2 | 4/2016 |
| JP | 6096893 B2 | 3/2017 |
| JP | 2021-508427 A | 3/2021 |

(Continued)

OTHER PUBLICATIONS

Nicolosi et al. "Proactive Two-Party Signatures for USer Authentication", NDSS, 2003 pp. 1-16 (Year: 2003).*

(Continued)

*Primary Examiner* — Hee K Song
(74) *Attorney, Agent, or Firm* — Sughrue Mion, PLLC

(57) ABSTRACT

In a digital signature system, a first processing apparatus performs processing comprising: receiving a first parameter generated using a first signing key and first biometric information to store the first parameter in a storage; receiving a second parameter generated using a second signing key and second biometric information to calculate a key difference between the first signing key and the second signing key from the first parameter and the second parameter; and calculating a value corresponding to a difference between the first biometric information and the second biometric information using the first parameter, the second parameter, and the key difference to verify whether or not the value satisfies a predetermined specified condition.

13 Claims, 12 Drawing Sheets

(56)         References Cited

FOREIGN PATENT DOCUMENTS

JP         2021-087167   A     6/2021
JP     WO2020-121459   A1    10/2021

OTHER PUBLICATIONS

Antonio Nicolosi, et al., "Proactive Two-Party Signings for User Authentication," Conference: Proceedings of the Network and Distributed System Security Symposium, NDSS 2003, San Diego, California, USA.

David Derler, et al., "Key-Homomorphic Signings: Definitions and Applications to Multiparty Signings and Non-Interactive Zero-Knowledge," Designs, Codes and Cryptography 87, 1372-1413, 2019.

* cited by examiner

FIG. 2

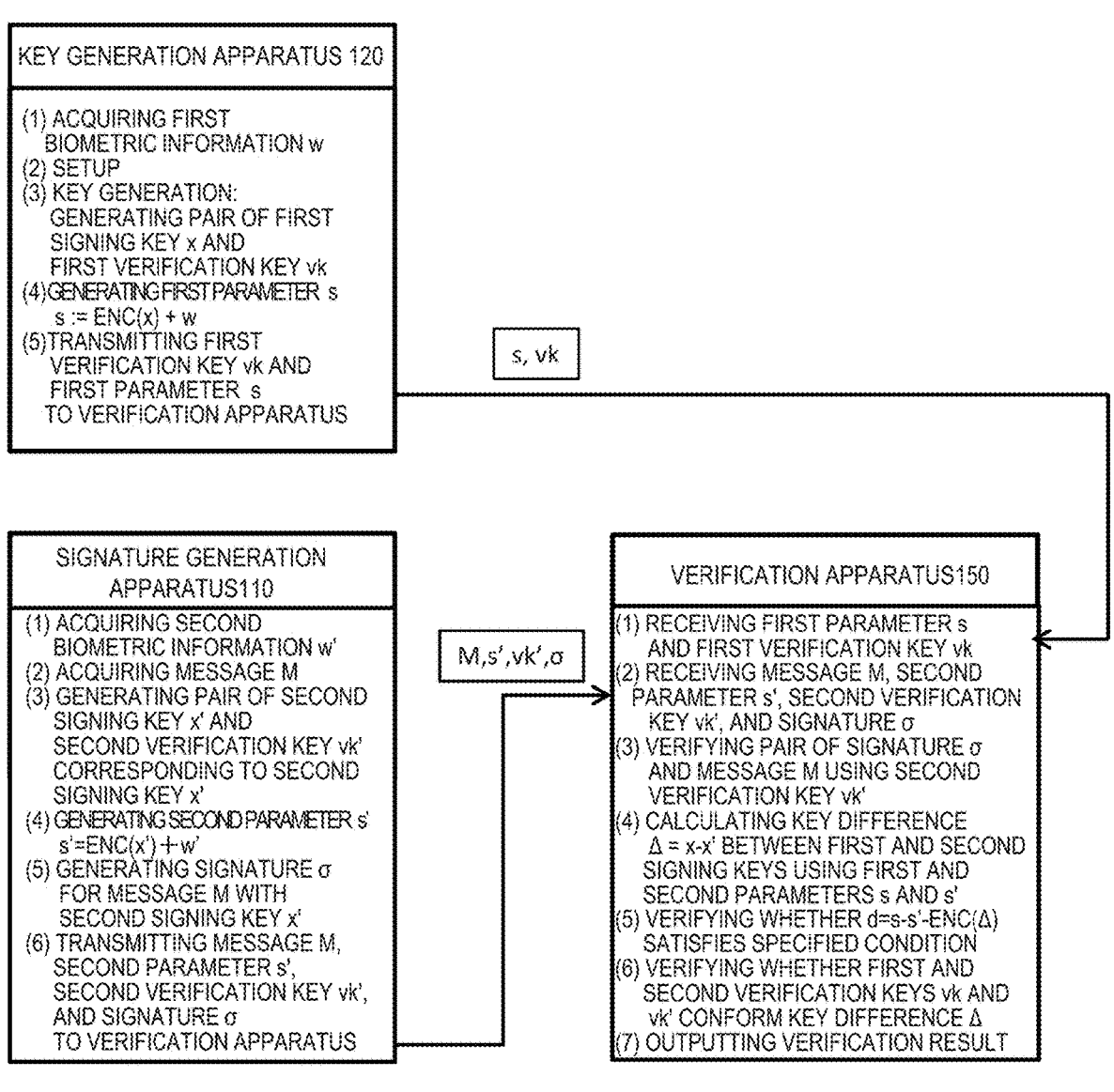

KEY GENERATION APPARATUS 120

(1) ACQUIRING FIRST
BIOMETRIC INFORMATION w
(2) SETUP
(3) KEY GENERATION:
GENERATING PAIR OF FIRST
SIGNING KEY x AND
FIRST VERIFICATION KEY vk
(4) GENERATING FIRST PARAMETER s
s := ENC(x) + w
(5) TRANSMITTING FIRST
VERIFICATION KEY vk AND
FIRST PARAMETER s
TO VERIFICATION APPARATUS s, vk

SIGNATURE GENERATION
APPARATUS110

(1) ACQUIRING SECOND
BIOMETRIC INFORMATION w'
(2) ACQUIRING MESSAGE M
(3) GENERATING PAIR OF SECOND
SIGNING KEY x' AND
SECOND VERIFICATION KEY vk'
CORRESPONDING TO SECOND
SIGNING KEY x'
(4) GENERATING SECOND PARAMETER s'
s'=ENC(x')+w'
(5) GENERATING SIGNATURE σ
FOR MESSAGE M WITH
SECOND SIGNING KEY x'
(6) TRANSMITTING MESSAGE M,
SECOND PARAMETER s',
SECOND VERIFICATION KEY vk',
AND SIGNATURE σ
TO VERIFICATION APPARATUS

M,s',vk',σ

VERIFICATION APPARATUS150

(1) RECEIVING FIRST PARAMETER s
AND FIRST VERIFICATION KEY vk
(2) RECEIVING MESSAGE M, SECOND
PARAMETER s', SECOND VERIFICATION
KEY vk', AND SIGNATURE σ
(3) VERIFYING PAIR OF SIGNATURE σ
AND MESSAGE M USING SECOND
VERIFICATION KEY vk'
(4) CALCULATING KEY DIFFERENCE
Δ = x-x' BETWEEN FIRST AND SECOND
SIGNING KEYS USING FIRST AND
SECOND PARAMETERS s AND s'
(5) VERIFYING WHETHER d=s-s'-ENC(Δ)
SATISFIES SPECIFIED CONDITION
(6) VERIFYING WHETHER FIRST AND
SECOND VERIFICATION KEYS vk AND
vk' CONFORM KEY DIFFERENCE Δ
(7) OUTPUTTING VERIFICATION RESULT

100

300

DIGITAL SIGNATURE SYSTEM, DIGITAL SIGNATURE METHOD

FIELD

Cross Reference to Related Applications

This application is based upon and claims the benefit of the priority of Japanese patent application No. 2023-102629, filed on Jun. 22, 2023, the disclosure of which is incorporated herein in its entirety by reference thereto. The present invention relate s to a digital signature system, a digital signature method and a non-transitory medium.

BACKGROUND

Digital signature is a technology which enables to verify a creator of an electronic document and check that the document has not been altered after creation thereof.
<Algorithm of Digital Signing>
The following outlines one of typical algorithms of digital signature.
Key Generation:
Key generation algorithm KeyGen( ) generates a pair of a signing key (secret key) sk and a verification key (public key) vk.

$$(sk, vk) \leftarrow KeyGen(1^\kappa) \tag{1}$$

where $\kappa$ is a security parameter.

Instead of the key generation algorithm KeyGen( ) directly receiving a security parameter, reception of public parameters which a setup algorithm has generated from the security parameter, may be accompanied with generating a pair of the signing key (secret key) sk and the verification key (public key) vk, in some cases.
Signing:
Generating a signature a for a message (document) M with the signing key sk. That is, the signature $\sigma$ is generated using the signing key (secret key) sk for a message M to be signed or a hash value (message digest) which is obtained as an output of a hash function to which the message M to be signed is supplied as an input.

$$\sigma \leftarrow Sign(sk, M) \tag{2}$$

Verification:
Verifying the signature $\sigma$ for the message (document) M (correctness of a pair of the message (document) M and the signature $\sigma$) using the verification key vk.

$$0/1 \leftarrow Verify(vk, M, \sigma) \tag{3}$$

Here, Verify ( ) is assumed to output (return) 1 if the signature is accepted and output (return) 0 if the signature is not-accepted (rejected), though not limited thereto.

In digital signature, in a case where a public key is publicly available, those who obtain a document and a signature can perform verification of the signature and the document. That is, using a verification key, which is a public key, it is possible to verify whether or not the signature has been generated for the document using the signing key. The digital signature may be used for a variety of applications, such as e-mail protection (S/MIME (Secure/Multipurpose Internet Mail Extensions)) and electronic contracts. The digital signature may be used as a contractor's signature to electronic contract data instead of a seal in a written contract. In a case of virtual currency remittance, a message which includes information on "to which address and how much to remit" and a sender's digital signature for the message are recorded in a blockchain. The remittance process is completed when this signature is correctly verified.

In digital signature, when a signing key is lost or stolen, security is compromised. It is difficult for a user to properly manage a signing key. When a signing key is not properly managed, there is a risk that the signing key may be lost or stolen. Failure to properly manage the signing key may disable the "signer" to generate a correct signature (e.g., when the signing key is lost) or allow a person who is not the "signer" to generate a correct signature (e.g., when the signing key is stolen).

Security of digital signatures is based on a fact that a signing key is managed to be kept in secret. An adversary, once obtaining the signing key, can generate a signature correctly. In other words, what digital signature guarantees is that "a person with a signing key has given the signature to a document," not that "a 'signer' has given the signature to a document. The larger the number of keys a user has to manage, the more difficult becomes the management thereof. Regarding a digital signature with a key enabled for distributed management, such as multi-signatures, reference may be made to, for example, Non-Patent Literature (NPL) 1.

A digital signature using biometric information has been proposed as a biometric signature (Fuzzy signature) (Patent Literature (PTL) 1). The following describes an outline of an example of the biometric signature.
Key Generation:
Generating a verification key from biometric information.
Signing:
Generating a signature $\sigma$ for a message (document) M using the biometric information.
Verification:
Verifying correctness of a pair of the message (document) M and the signature using the verification key.

[PTL 1] Japanese Patent No. 5707311
[PTL 2] Japanese Unexamined Patent Application Publication No. 2001-087167 A
[NPL 1] Antonio Nicolosi, et al., "Proactive Two-Party Signings for User Authentication," Conference: Proceedings of the Network and Distributed System Security Symposium, NDSS 2003, San Diego, California, USA
[NPL 2] David Derler, et al., "Key-Homomorphic Signings: Definitions and Applications to Multiparty Signings and Non-Interactive Zero-Knowledge," Designs, Codes and Cryptography 87, 1372-1413, 2019

SUMMARY

A digital signature using biometric information in place of a key, can reduce a risk of losing the key as compared with the digital signature. However, when a key is biometric information, leakage of the biometric information means leakage of the key. It is difficult to change biometric information. Therefore, once biometric information is leaked, a key from the biometric information can no longer be safely used.

An object of the present disclosure is to provide a system, method and non-transitory medium, each enabling to reduce risk such as loss and leakage of a key in a digital signature and to improve an accuracy in confirming identity of biometric information.

In one of aspects of the present disclosure, there is disclose d a digital signature system including a first processing apparatus that includes at least a first processor, a first memory storing program instructions executable by the first processor, and a first communication interface and a second processing apparatus that includes at least a second processor, a second memory storing program instructions executable by the second processor, and a second communication interface to communicatively connect with the first communication interface of the first processing apparatus, the first processing apparatus and the second processing apparatus configured to implement a digital signature scheme using biometrics. The first processing apparatus or the second processing apparatus is configured to execute the program instructions to perform processing comprising:

based on a first parameter which is generated using a first signing key and first biometric information, and a second parameter which is generated using a second signing key and second biometric information or generated using at least the first parameter, calculating a value corresponding to a difference between the first biometric information and the second biometric information; and verifying whether or not the value satisfies a predetermined specified condition.

In one of aspects of the present disclosure, the first processing apparatus receives a first parameter generated using a first signing key and first biometric information to store in a storage the first parameter, receives a second parameter generated using a second signing key and second biometric information to send the second parameter to the second processing apparatus, calculates a key difference between the first signing key and the second signing key, using the first parameter and the second parameter, and calculates a value corresponding to a difference between the first biometric information and the second biometric information, using the first parameter, the second parameter, and the key difference to verify whether or not the value satisfies a predetermined specified condition.

In another one of aspects of the present disclosure, the second processing apparatus that comprises at least a processor and a communication interface. The second processing apparatus acquires second biometric information, receives a second parameter generated using a differential key and a first parameter to generate a second signing key, using the second parameter and the second biometric information, and calculates a value corresponding to a difference between first biometric information and the second biometric information, using the second parameter, the second biometric information and the second signing key to verify whether or not the value satisfies a specified condition.

In one of aspects of the present disclosure, there is disclosed a digital signature method in which a digital signature scheme using biometrics is implemented at least by a first node and a second node, the method comprising:

calculating, by one of the first node and the second node, a value corresponding to a difference between first biometric information and second biometric information, based on a first parameter which is generated using a first signing key and the first biometric information, and a second parameter which is generated using a second signing key and the second biometric information or generated using at least the first parameter; and verifying, by the one of the first node and the second node, whether or not the value satisfies a predetermined specified condition.

In another one of aspects of the present disclosure, there is disclosed a digital signature method in which a digital signature scheme using biometrics is implemented at least by a first node and a second node, the method comprising:

receiving, by the first node, the first parameter to store the first parameter in a storage;

receiving, by the first node, the second parameter generated using the second signing key and the second biometric information;

calculate a key difference between the first signing key and the second signing key from the first parameter and the second parameter;

calculating, by the first node, a value corresponding to a difference between the first biometric information and the second biometric information using the first parameter, the second parameter, and the key difference; and verifying, by the first node, whether or not the value satisfies the predetermined specified condition.

In yet another one of aspects of the present disclosure, there is disclosed a digital signature method in which a digital signature scheme using biometrics is implemented at least by a first node and a second node, the method comprising:

acquiring, by the second node, the second biometric information, receiving, by the second node, the second parameter generated using a differential key and the first parameter;

generating, by the second node, a second signing key using the second parameter and the second biometric information;

calculating, by the second node, a value corresponding to the difference between first biometric information and the second biometric information, using the second parameter, the second biometric information and the second signing key; and verifying, by the second node, whether or not the value satisfies a specified condition.

In one of aspects of the present disclosure, there is disclosed a non-transitory medium storing therein a program causing one of a first processor and a second processor which implement a digital signature scheme using biometrics, to execute processing comprising:

calculating a value corresponding to a difference between first biometric information and second biometric information, based on a first parameter which is generated using a first signing key and the first biometric information, and a second parameter which is generated using a second signing key and the second biometric information or generated using at least the first parameter; and verifying whether or not the value satisfies a predetermined specified condition.

In one of aspects of the present disclosure, there is disclosed a non-transitory medium storing therein a program causing a first processing apparatus that comprises at least a processor and a communication interface to execute processing comprising:

receiving a first parameter generated using a first signing key and first biometric information to store the first parameter;

receiving a second parameter generated using a second signing key and second biometric information to calculate a key difference between the first signing key and the second signing key from the first parameter and the second parameter; and calculating a value corresponding to a difference between the first biometric information and the second biometric information using the first parameter, the second parameter, and the key difference to verify whether or not the value satisfies a predetermined specified condition.

In another one of aspects of the present disclosure, there is disclosed a non-transitory medium storing therein a program causing a second processing apparatus that comprises at least a processor and a communication interface to execute processing comprising:

acquiring a second biometric information;

receiving a second parameter generated using a differential key and a first parameter to generate a second signing key from the second parameter and the second biometric information; and calculating a value corresponding to a difference between first biometric information and the second biometric information using the second parameter, the second biometric information and the second signing key to verify whether or not the value satisfies a specified condition.

According to the present disclosure, there are provided a system, method and non-transitory medium, each enabling to reduce both risks of loss and leakage of a key simultaneously in digital signature, thus improving accuracy in confirming identity of biometric information.

BRIEF DESCRIPTION OF DRAWINGS

FIG. 2 is a diagram illustrating an operation process in one of example embodiments.

DETAILED DESCRIPTION

The following describes example embodiments of the present disclosure. In a digital signature scheme using biometrics, there might be a case where a signature generated using biometric information of a person different from a person whose biometric information has been registered is treated as a signature generated using the biometric information of the identical person with the registered biometric information, due to correction capability of encoding/decoding on biometric information. In the present disclosure, a system and a method are proposed for a digital signature scheme using biometrics that enables to enhance security and reliability against leakage or the like of biometric information and increase accuracy in identification of the same person to a level of biometric authentication. As will become clear in the following description, one of example embodiments includes: calculating a value corresponding to difference between first biometric information and second biometric information from a first parameter and a second parameter, wherein the first parameter is generated from registered biometric information (first biometric information) and the second parameter is generated from biometric information (second biometric information) to be used for generation of a signature, and verifying whether or not the value satisfies a predetermined specified condition. This enables to improve an accuracy in confirming whether the biometric information used for generating signature (the second biometric information) is biometric information of the same person of the registered biometric information (first biometric information).

Figure 1:
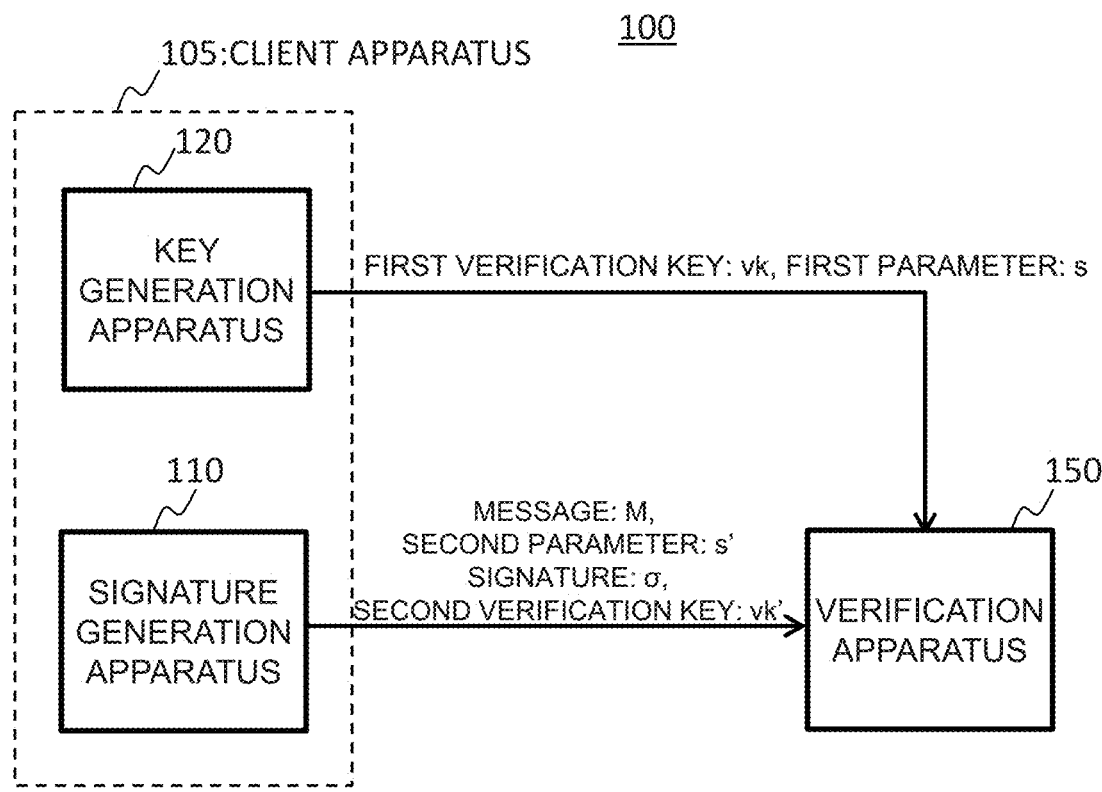
FIG. 1 is a diagram illustrating one of examples embodiments.

FIG. 1 is a diagram schematically illustrating a configuration example of one example embodiment of the present disclosure. Referring to FIG. 1, a digital signature system 100 includes a key generation apparatus 120, a signature generation apparatus 110, and a verification apparatus 150.

In a key registration phase, the key generation apparatus 120 generates a pair of a secret key sk and a public key vk, with a security parameter $\kappa$, by using a key generation algorithm KeyGen.

$$(sk, \ vk) \leftarrow KeyGen(1^\kappa) \tag{4}$$

This key generation algorithm KeyGen returns a pair of the secret key sk and the public key vk, as a return value at the same time. The KeyGen may receive a public parameter(s) generated from a security parameter $\kappa$ in a setup algorithm and may generate the pair of the secret key sk and the public key vk therefrom. In the key generation, a public key vk may be generated from a secret key sk using a one-way hash function (cryptographic hash function, linear hash function). Alternatively, the public key vk may be generated, using a generator g in a multiplicative group G of a prime order p and a mapping $\phi$ (mapping from a set to which the secret key sk belongs to Z (Z is an entire set of integers)), by calculating $vk = g\hat{\ }\phi(sk)$ (where $\hat{\ }$ is a power operator). Further alternatively, the public key vk may be generated using a hash function with key or the like. In the following, this secret key sk is referred to as a first signing key x, and the public key vk is referred to as a verification key.

The key generation apparatus 120 acquires first biometric information w, applies an encoding function (encoding algorithm) (Encode, ENC) to the first signing key x to obtain an encoded key $c \leftarrow Encode(x)$ and performs composition (e.g., addition or exclusive OR) of the encoded key ENC(x) and the first biometric information w to generate a first parameter s. The first parameter s, in which the first signing key x is encoded and embedded in the first biometric information w, is also referred to as a first parameter s.

$$s := ENC(x) + w \tag{5}$$

Applying an encoding function (Encode)/a decoding function (Decode) is referred to as encoding/decoding.

The key generation apparatus 120 transmits the verification key vk and the first parameter s to the verification apparatus 150. The key generation apparatus 120 and the verification apparatus 150 may be communicatively connected via a network (e.g., at least one of a wired LAN (Local Area Network), a wireless LAN, a WAN (Wide Area Network), a mobile communication network, a virtual network, etc.). In FIG. 1, arrow lines with information to be transmitted, such as the first parameter s, the verification key vk, etc., are schematic examples of transmission of such information (a handshake between a source and a destination is omitted), and do not mean that the communication between the source and the destination is a one-way communication (or unidirectional). The same applies to subsequent drawings. The verification key vk may not be transmitted to the verification apparatus 150, but it may be registered and stored in a key server (a public key database), etc., in association with a key ID, etc. In this case, the verification apparatus 150 may retrieve the verification key vk from the key server (public key database), etc., as necessary.

The signature generation apparatus 110 acquires second biometric information w' and a message M for signature, when actually signing a message (signing phase), and also generates a pair of a second signing key x' and a second verification key vk'. The signature generation apparatus 110 composites the second signing key x' and the second biometric information w' to generate a second parameter s'. The second parameter s', in which the second signing key x' is encoded and embedded in the second biometric information w', is also referred to as a second parameter s'.

$$s' := ENC(x') + w' \tag{6}$$

The signature generation apparatus 110 calculates a signature σ for a message M with the second signing key x'. The signature generation apparatus 110 transmits the message M, the second parameter s', the second verification key vk', and the signature σ to the verification apparatus 150.

The verification apparatus 150 receives the first verification key vk and the first parameter s transmitted from the key generation apparatus 120 and receives the message M, the second parameter s', the second verification key vk' and the signature σ transmitted from the signature generation apparatus 110.

The verification apparatus 150 verifies the signature σ for message M with the second signing key x', using the second verification key vk'.

$$Verify(vk', M, \sigma) \tag{7}$$

The verification apparatus 150 terminates a process when a result of a verification of the signature σ is rejection (non-acceptance). The verification apparatus 150 calculates a difference (key difference) Δ between the first signing key x and the second signing key x' using the first parameter s and the second parameter s', when a result of a verification of the signature σ is acceptance.

$$\Delta \leftarrow Diff(s, s') \tag{8}$$

Here, "←" indicates that a left side is generated as a result of an operation on a right side (i.e., the result of the operation on the right side is assigned to a variable on the left side). As a function Diff, s−s' may be input to a decoding function (Decode, DEC) as follows (In this case, it can be said that the only difference between Diff and Decode is, substantially, whether s and s' are input as two arguments or (s−s') is input as a single argument).

$$\Delta \leftarrow Decode(s - s') \tag{9}$$
$$= Decode\,(ENC(x) - ENC(x') + w - w')$$
$$= Decode\,(ENC(x - x') + w - w')$$

In Equation (9),

ENC(x)−ENC(x')=ENC(x−x') holds due to a linearity of the encoding function ENC.

The encoding function ENC converts a plaintext m in an information source space into a code c. The decoding function converts the code c into the plaintext m.

$$c \leftarrow Encode(m) \tag{10}$$
$$m \leftarrow Decode(c) \tag{11}$$

Here, $$m = DEC\,(c') \tag{12}$$

must hold for a code c' whose difference from c is within a correction capability, where c is a code of any plaintext m in the information source space.

As explained below, in one example embodiment, a linear code is used. The linear code has linearity as follows. Linearity:

$$ENC(m1) + ENC(m2) \tag{13}$$

ENC(m1)+ENC(m2) is a code word ENC(m1+m2) for m1+m2. That is, for example, a sum (difference) of the code words ENC(m1) and ENC(m2) of respective two plaintexts m1 and m2 is also a code word, which is equal to the sum code word ENC(m1+m2) of m1 and m2 (or difference code word ENC(m1−m2) of m1 and m2). Therefore, $$m1 + m2 = DEC(ENC(m1) + ENC(m2)) \tag{14}$$

holds. In Equation (14), the "+" on the left and right sides need not be the same operation.

Regarding coding, for example, error-correcting codes (Hamming codes, BCH (Bose-Chaudhuri-Hocquenghem code) codes, RS (Reed-Solomon) codes, LDPC (low-density parity-check code) codes, etc.) may be used. Alternatively, for example Lattice coding may be used. More concretely, methods using integer lattices, triangular lattices, and more complex lattices are known (see PTL 2, etc.).

If the difference w−w' between the first biometric information w and the second biometric information w' is included in the correction capability of the Decode function of the linear code, a following equation holds from Equation (9).

$$\Delta = DEC(ENC(x - x')) = x - x' \tag{15}$$

The verification apparatus 150 calculates the following equation using the first parameter s, the second parameter s', and an encoded value ENC(Δ) of the key difference Δ.

$$d = s - s' - ENC(\Delta) \tag{16}$$

Here, d corresponds to the difference w−w' between the first biometric information w and the second biometric information w'. The verification apparatus 150 checks whether a value corresponding to the difference between the first biometric information w and the second biometric information w' satisfies a predetermined specified condition. A norm of d may be used as a value corresponding to the difference between the first biometric information w and the second biometric information w'. One example of a norm of d may be a $L^2$norm. The verification apparatus 150 rejects (terminates the process) if the norm of d does not satisfy the specified condition.

The verification apparatus 150 checks whether or not the key difference Δ(=x−x'), which is a difference between the first signing key x and the second signing key x', the first verification key vk and the second verification key vk' conform to a relationship between a signing key and a verification key in a specified signature scheme. When verified not to conform, a verification result is rejection. The verification apparatus 150 outputs the verification result (acceptance/non-acceptance or rejection) of the signature σ if it conforms.

FIG. 2 illustrates operation processes in each of the above apparatuses described with reference to FIG. 1. Some overlap with the explanation above, but operations are supplemented below. Note that in FIG. 2, the number in parentheses for each apparatus represents a processing number (step number) at that apparatus.

The key generation apparatus 120 acquires first biometric information w for user registration (step 1). The key generation apparatus 120 performs a setup algorithm for a digital signature scheme. The key generation apparatus 120 decides a parameter (public parameter) pp in advance according to a security parameter κ and makes it available to a user (setup) (step 2).

$$pp \leftarrow Setup(1^\kappa) \tag{17}$$

The parameter pp includes information on group and hash function, etc., is a parameter common to the system, and is referred to here as a public parameter. Setup may be performed, for example, before system operation, and each of the apparatuses 110, 120, and 150 of the digital signature system 100 can all use (share) the public parameter pp.

The key generation apparatus 120 generates a pair of a first signing key (secret key) and a first verification key (public key) according to the public parameter pp (step 3).

$$(sk, vk) \leftarrow KeyGen(pp) \tag{18}$$

The key generation apparatus 120 encodes the first signing key x to obtain an encoded key ENC(x), then composes the encoded key ENC(x) and a first biometric information w to generate a first parameter s (step 4).

$$s := ENC(x) + w \tag{19}$$

The key generation apparatus 120 transmits the verification key vk and the first parameter s to the verification apparatus 150 (step 5).

The verification apparatus 150 obtains the verification key vk and the first parameter s from the key generation apparatus 120 and stores them in a storage (step 1).

The signature generation apparatus 110 acquires user's biometric information (second biometric information) w' (step 1), acquires a message M of a signature target (step 2), and generates a pair of a second signing key x' and a second verification key vk' corresponding to the second signing key x' (step 3). The second signing key x' is also referred to as a temporary signing key. The signature generation apparatus 110 composes an encoded value of the second signing key x' and the second biometric information w' to generate the second parameter s' (step 4).

$$s' = ENC(x') + w' \tag{20}$$

The signature generation apparatus 110 generates a signature σ for a message M with the second signing key x'.

$$\sigma \leftarrow Sign(x', M) \tag{21}$$

The signature generation apparatus 110 transmits the message M, the second parameter s', the second verification key vk', and the signature σ to the verification apparatus 150 (step 6).

The verification apparatus 150 receives the message M, the second parameter s', the second verification key vk', and the signature σ transmitted from the signature generation apparatus 110 (step 2).

The verification apparatus 150 verifies the signature σ for message M with the second signing key x' using the second verification key vk' (step 3). The verification apparatus 150 terminates a process if a verification result is rejection (non-acceptance).

$$Verify(vk', M, \sigma) \tag{22}$$

The verification apparatus 150 calculate s a key difference Δ between the first signing key x and the second signing key x' using the first parameter s and the second parameter s', if the verification result of the signature σ is acceptance.

$$\Delta \leftarrow Diff(s, s') \tag{23}$$

Here, the function Diff may be implemented as a Decode function which inputs s–s', as follows.

$$\Delta \leftarrow \text{Decode } (s - s') = \text{Decode } (ENC(x) - ENC(x') + w - w') = \quad (24)$$

$$\text{Decode } (ENC(x - x') + w - w')$$

If a difference w–w' between the first biometric information w and the second biometric information w' is within a correction capability of code, then from Equation (24)

$$\Delta = DEC \ (ENC(x - x')) \quad (25)$$

and following holds.

$$\Delta = x - x' \quad (26)$$

The verification apparatus 150, using the first parameter s, the second parameter s' and an encoded value Enc(Δ) of the key difference Δ, calculates $$d = s - s' - ENC(\Delta) \quad (27)$$

and checks whether a value corresponding to the difference between the first biometric information w and the second biometric information w' satisfies the predetermined specified condition (step 5).

A norm of d, which is a difference between the first biometric information w and the second biometric information w', is used as the value corresponding to the difference between the first biometric information w and the second biometric information w', as described above. The verification apparatus 150 rejects (terminates the process and therefore also rejects a signature which has been accepted) if the norm of d does not satisfy the specified condition. The specified condition is, for example, that a similarity in a vector space (e.g., Euclidean distance or cosine similarity) between the first biometric information w and the second biometric information w' is within a predetermined specific range.

The reason for rejecting the norm of d (e.g., $L^2$ norm L2(d)) when it does not satisfy the specified condition is as follows.

Figure 11:
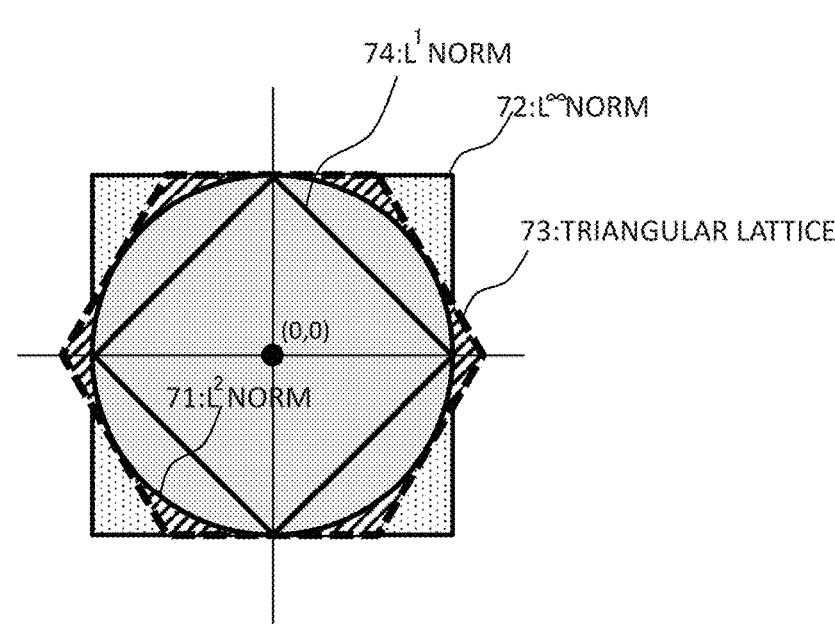
FIG. 11 is a diagram illustrating one of example embodiments.

If a range of biometric information that should be evaluated as biometric information of the same person differs from the difference (d) between two biometric information which can be absorbed by the correction capability of the error correction coding, the difference between the two biometric information may be absorbed by the correction capability of the coding, even though a signature has been generated using biometric information that should be evaluated as a person different from a person whose biometric information has been used at the time of key generation. In a such case, accepting the signature can be avoided by adding the rejection process of the norm of d. In the following, one of non-limiting examples, in which a biometric information is a two-dimensional vector and a Euclidean distance ($L^2$ norm of a difference vector) is used as a similarity between the two vectors of biometric information, will be described with reference to FIG. 11. If the origin (black point in the center) indicates a first biometric information w, a range of biometric information that should be determined as the biometric information of the same person is inside a circle (71) where a Euclidean distance between the two biometric information is within a specific range in FIG. 11. On the other hand, a difference that can be absorbed when the difference of the biometric information is evaluated by the Chebyshev distance ($L^\infty$ norm of the difference) is inside a square (72) in FIG. 11. Therefore, biometric information in an area inside the square (72) and outside the circle (71) of the Euclidean distance ($L^2$ norm) is evaluated to be a signature by the same person, since the difference is absorbed in the biometric signature, even though it is not the biometric information of the same person as the first biometric information w at the origin. A difference that may be absorbed when the difference of biometric information is evaluated by a triangular lattice is inside a hexagon (73) in FIG. 11. The same occurs as in $L^\infty$ norm case. The difference in range between the Euclidean distance and the $L^\infty$ norm etc. is more extensive in higher dimensions.

A Manhattan distance ($L^1$ norm of a difference vector) can be used as a similarity between the two vectors of biometric information. If the origin (black point in the center) is the first biometric information w, a range of biometric information that should be determined as the biometric information of the same person is inside a diamond (74) where the Manhattan distance between the two biometric information is within a specific range in FIG. 11. On the other hand, a difference that is absorbed when the difference of the biometric information is evaluated by the Chebyshev distance ($L^\infty$ norm of the difference) is inside a square (72) in FIG. 11. Therefore, biometric information in an area inside the square (72) and outside the diamond (74) of the Euclidean distance ($L^2$ norm) is evaluated to be a signature by the same person, since the difference is absorbed in the biometric signature, etc., even though it is not the biometric information of the same person as the first biometric information w at the origin. A difference that may absorbed when the difference of biometric information is evaluated on the triangular lattice is inside a hexagon (73) in FIG. 11. The same occurs as in $L^\infty$ norm case. The difference in range between the Manhattan distance and the $L^\infty$ norm etc. is more extensive in higher dimensions.

The verification apparatus 150 cannot know two biometric information, i.e., the first biometric information w and the second biometric information w'. Other apparatuses 110 and 120 cannot know the two biometric information. It is not possible to separate an encoded key ENC(x) and the first biometric information w from each other from the first parameter s, in which the encoded key ENC(x) is embedded in the first biometric information w. Similarly, it is not possible to separate an encoded key ENC(x') and the second biometric information w' from the second parameter s'. Therefore, the verification apparatus 150 uses the difference between the first parameter s and the second parameter s' and ENC(Δ), which is obtained by encoding a key difference Δ decoded from the first parameter s and the second parameter s', and calculates the difference between the first biometric information w and the second biometric information w' by Equation (27).

The following holds for Equation (27).

$$d = s - s' - ENC(\Delta) = ENC(x) + w - (ENC(x') + w') - ENC(x - x') = \quad (28)$$

$$w - w' + ENC(x) - ENC(x') - ENC(x - x') =$$

$$w - w' + ENC(x - x') - ENC(x - x') = w - w'$$

That is, under the linear coding, Equation (27) corresponds to a vector subtraction of the first biometric information w and the second biometric information w', and the L2 norm L2(d) of d corresponds to the Euclidean distance between the vectors of the first biometric information w and the second biometric information w'. The verification apparatus 150 terminates a process if $L^2$ norm L2(d) of d is less than or equal to a predetermined threshold value (L2(d) ≤Th).

If $L^2$ norm L2(d) of d is less than or equal to the predetermined threshold value (L2(d)≤Th), then the verification apparatus 150 checks whether or not the key difference Δ(=x–x'), which is a difference between the first signing key x and the second signing key x', and the first verification key vk and the second verification key vk' conform to a relationship between a signing key and a verification key in a specified signature scheme (step 6). If they do not conform thereto, the verification apparatus 150 rejects thereof (or it may output that a verification result is rejection). If they conform thereto, the verification apparatus 150 outputs a verification result (acceptance/non-acceptance) of the signature σ (step 7).

Figure 3:
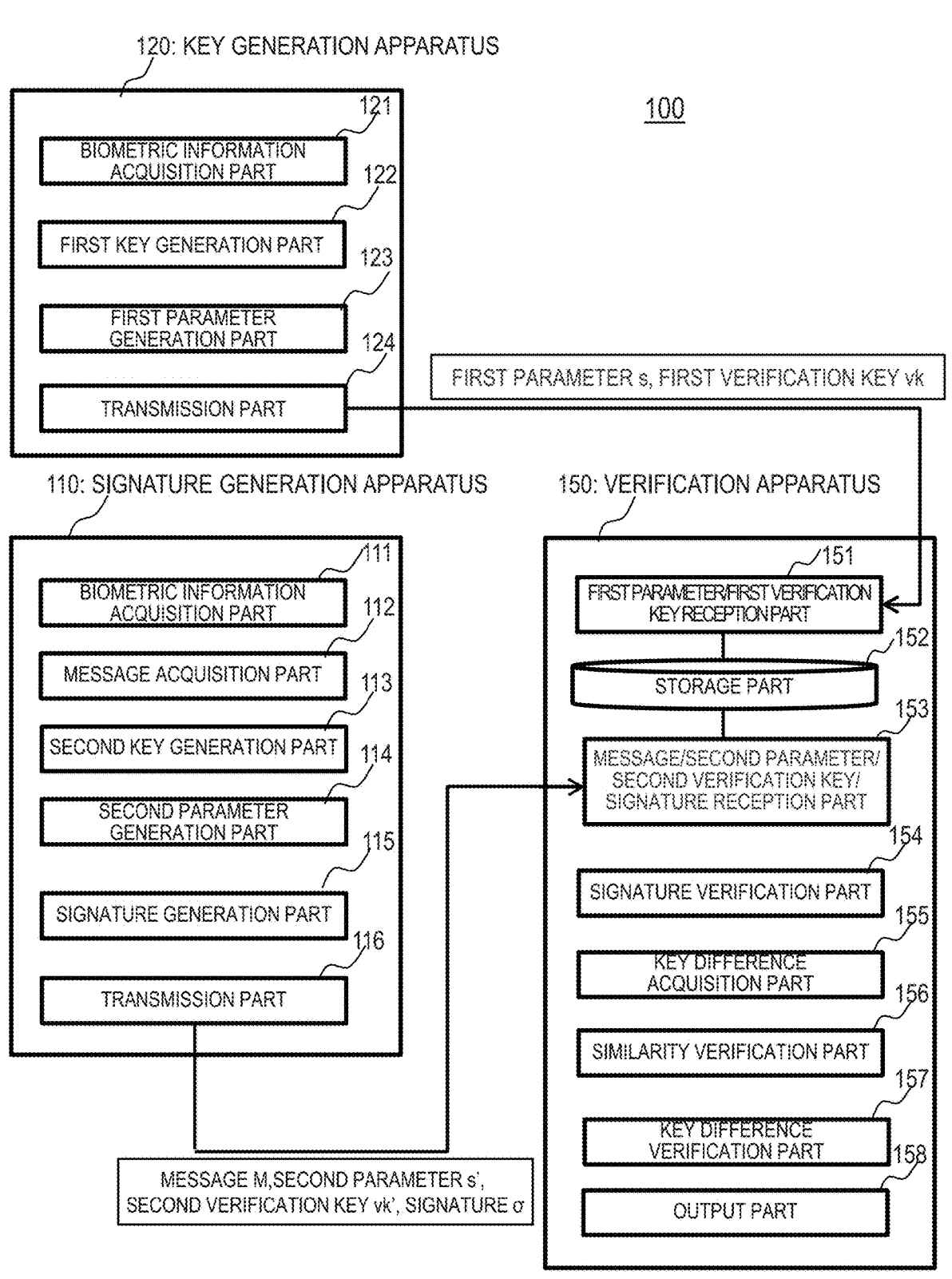
FIG. 3 is a diagram illustrating a configuration in one of example embodiments.

FIG. 3 is a diagram illustrating an example of a configuration of each apparatus in FIG. 1. The key generation apparatus 120 includes a biometric information acquisition part 121, a first key generation part 122, a first parameter generation part 123 and a transmission part 124. The biometric information acquisition part 121 includes a sensor (not shown) to acquire first biometric information w of user (or includes an interface to receive the first biometric information w acquired by an external sensor via a network such as a communication line). The first key generation part 122 generates a pair of a first signing key x and a first verification key vk. The first parameter generation part 123 composites a first parameter s from the first signing key x and the first biometric information w. The transmission part 124 transmits the first verification key vk and the first parameter s to the verification apparatus 150.

The signature generation apparatus 110 includes a biometric information acquisition part 111, a message acquisition part 112, a second key generation part 113, a second parameter generation part 114, a signature generation part 115, and a transmission part 116. The biometric information acquisition part 111 includes a sensor (not shown) to acquire second biometric information w' of a user. The message acquisition part 112 acquires a message M. The second key generation part 113 generates a pair of a second signing key x' and a second verification key vk' corresponding to the second signing key x'. The second parameter generation part 114 composites a second parameter s' from the second signing key x' and the second biometric information w'. The signature generation part 115 generates a signature σ for a message M using the second signing key x'. The transmission part 116 transmits the message M, the second parameter s', the signature σ and the second verification key vk' to the verification apparatus 150. The sensor (not shown) in the biometric information acquisition part 111 has the same configuration as the sensor (not shown) in the biometric information acquisition part 121 of the key generation apparatus 120.

The verification apparatus 150 includes a first parameter/first verification key reception part 151, a storage part 152, a message/second parameter/second verification key/signature reception part 153, a signature verification part 154, a key difference acquisition part 155, and a similarity verification part 156. The first parameter-first verification key reception part receives the first parameter s and the first verification key vk transmitted from the key generation apparatus 120. The storage part 152 stores the first parameter s and the first verification key vk received therein. The message/second parameter/second verification key/signature reception part 153 receives the message M, the second parameter s', the signature σ, and the second verification key vk' transmitted from the signature generation apparatus 110. The signature verification part 154 verifies correctness of the pair of the message M and the signature σ using the second verification key vk'. The key difference acquisition part 155 obtains a key difference Δ between the first signing key x and the second signing key x' from the first parameter s and the second parameter s'. The similarity verification part 156 calculates a similarity between the first biometric information w and the second biometric information w' and verifies whether the second biometric information w' and the first biometric information w are from the same person.

The similarity verification part 156 may use $L^2$norm of a difference between the first biometric information w and the second biometric information w' as the similarity between the first biometric information w and the second biometric information w', as described above. In this case, the similarity verification part 156 may obtain a difference d between the first biometric information w and the second biometric information w' by the Equation (27) above, calculate the $L^2$ norm of d, and verify whether or not L2(d) satisfies the specified condition.

The verification apparatus 150 is further provided with a key difference verification part 157 and an output part 158. The key difference verification part 157 checks whether the key difference Δ, which is a difference between the first signing key x and the second signing key x', and the first verification key vk and the second verification key vk' conform to a relationship between a signing key and a verification key in a specified signature scheme. The output part 158 outputs a verification result of signature, and a rejection in L2norm verification and key difference verification, and so on. A process by the key difference verification part 157 may be performed if $L^2$ norm L2(d) of d in Equation (27) satisfies the specified condition as a result of verification in the similarity verification part 156. The output part 158 may notify a verification result of signature, and a rejection in the similarity verification and key difference verification, and so on to the signature generation apparatus 110.

Figure 4:
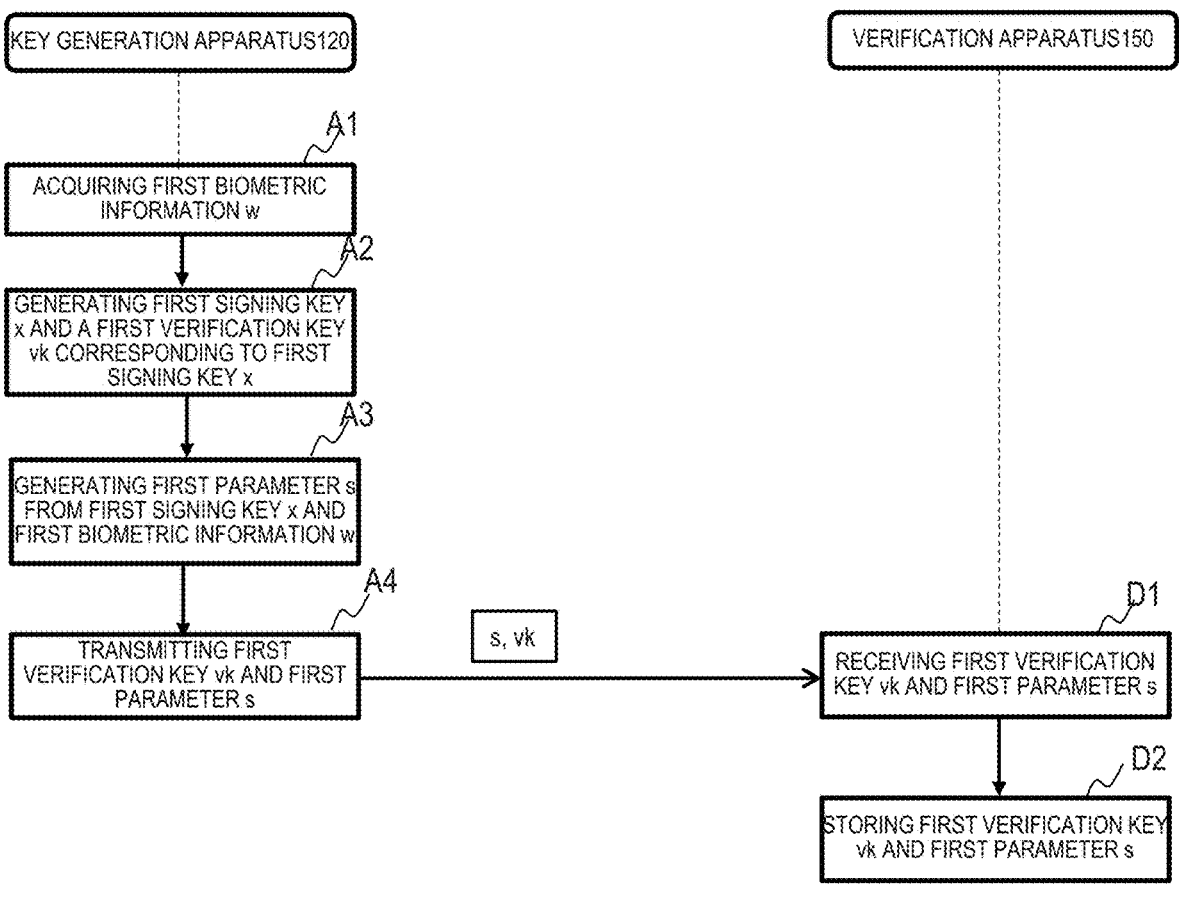
FIG. 4 is a diagram illustrating a process sequence in one of example embodiments.

FIG. 4 is a diagram illustrating an example of processing operations in a key registration phase in the present example embodiment illustrated in FIG. 3. The biometric information acquisition part 121 in the key generation apparatus 120 acquires first biometric information w of a user (step A1).

The first key generation part 122 in the key generation apparatus 120 generates a pair of a first signing key x and a first verification key vk (step A2).

The first parameter generation part 123 in the key generation apparatus 120 composites the first signing key x and the first biometric information w to generate a first parameter s. In more detail, the first parameter generation part 123 add the first biometric information w to a code word ENC(x) obtained by encoding the first signing key to generate $$s := ENC(x) + w \qquad (29)$$

(step A3).

Hereinafter, as a non-limiting example, Equation (29) is explained according to an example using a square lattice as an encoding (e.g., PTL 2). The first biometric information w and the second biometric information w' are n-dimensional real vectors.

$$w = (w1, \ldots, wn), w' = (w'1, \ldots, w'n) \tag{30}$$

As a distance between the first biometric information w and the second biometric information w', $L^\infty$ norm (maximum norm) is expressed as follows.

$$d(n)_\infty(w, w'^:) = \max \{|wi - w'i|, i = 1, \ldots, n\} \tag{31}$$

If $d(n)_\infty(w, w')$ is less than or equal to the predetermined threshold value $t_h(d(n)_\infty(w, w') \leq th)$, it is considered as a match (same organism).

Lattice set L is defined as follows.

$$L=\{Y=(y1, \ldots, yn)| \; yi \text{ is a non-negative integer,} \\ 0 \leq yi \leq K\} \tag{32}$$

Here, K is a specified integer that is sufficiently larger than $t_h$ and $|w_i|$.

The function int ( ) that maps one integer z to an n-dimensional vector $Y \in L$ is defined as follows.

$$z \leftarrow \text{int}(Y) = \sum_{i=1}^{n} y_i (2K)^{i-1} \tag{33}$$

An inverse function $\text{int}^{-1}( )$ is a function that maps integer z to n-dimensional vector Y.

$$Y \leftarrow \text{int}^{-1}(z) \tag{34}$$

When the first signing key x (integer) is input into the inverse function $\text{int}^{-1}( )$, an n-dimensional vector A is obtained.

$$A = (a1, \ldots, an) \leftarrow \text{int}^{-1}(x) \tag{35}$$

If an encoding function Encode( ) is set to $2t_h * \text{int}^{-1} ( )$, then encoded key c, which is obtained by encoding the first signing key x, becomes an n-dimensional vector and is given below.

$$c = (c1, \ldots, cn) \leftarrow \text{Encode}(x) = 2t_h * \text{int} - 1(x) = 2t_h * (a1, \ldots, an) \tag{36}$$

Thus, the first parameter s is given by follows.

$$s := ENC(x) + w = \\ 2t_h * (a1, \ldots, an) + (w1, \ldots, wn) = (2t_h * a1 + w1, \ldots, 2t_h * an + wn) \tag{37}$$

The transmission part 124 in the key generation apparatus 120 transmits the first verification key vk and the first parameter s to the verification apparatus 150. The key generation apparatus 120 may upload the first verification key vk to a key server (not shown) or the like and publish it on the Internet or the like.

The first parameter/first verification key reception part 151 in the verification apparatus 150 receives the first parameter s and the first verification key vk (step D1) and store them in the storage part 152 (step D2). The verification apparatus 150 may acquire and store the verification key vk from a key server (not shown) that has registered the verification key.

Figure 5:
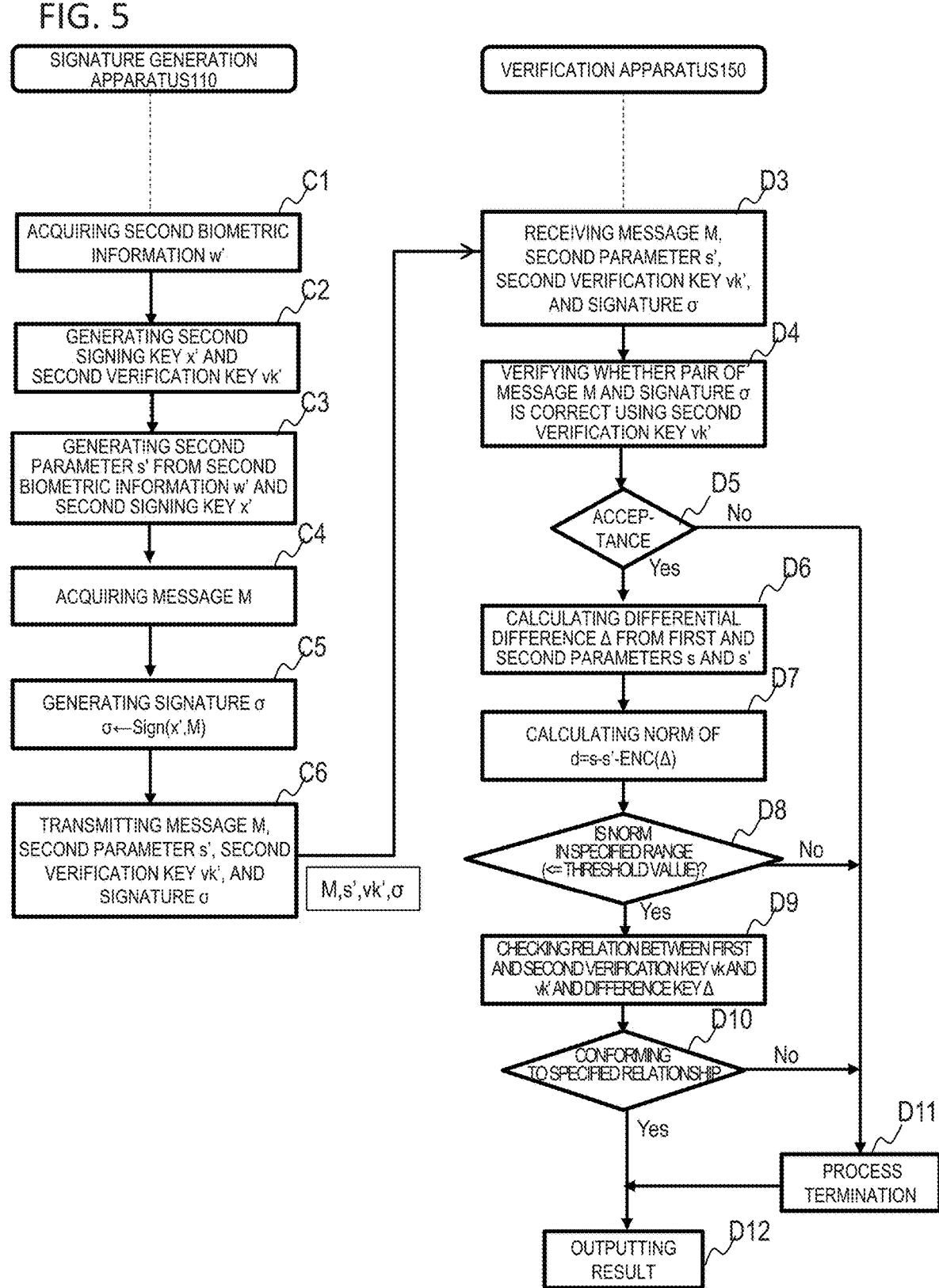
FIG. 5 is a diagram illustrating a process sequence in one of example embodiments.

FIG. 5 is a diagram illustrating an example of a processing operation of signature generation and verification in the present example embodiment illustrated in FIG. 3.

The biometric information acquisition part 111 in the signature generation apparatus 110 acquires a second biometric information w' of a user (step C1).

The second key generation part 113 in the signature generation apparatus 110 generates a pair of a second signing key x' and a second verification key vk' corresponding to the second signing key x' (step C2).

The second parameter generation part 114 in the signature generation apparatus 110 generates a second parameter s' from value ENC(x') obtained by encoding the second signing key x' and the second biometric information w' (step C3).

$$s' := ENC(x') + w' \tag{38}$$

As a non-limiting example, if a square lattice is used as an encoding the same as in the first parameter s, from $$c' = (c'1, \ldots, c'n) \leftarrow \text{Encode}(x') = 2t_h * \text{int}^{-1}(x') = 2t_h * (a'1, \ldots, a'n), \tag{39}$$

second parameter s' is a n-dimensional real-valued vector as follows.

$$s' := 2t_h * \text{int}^{-1}(x') + w' = 2t_h * (a'1, \ldots, a'n) + (w'1, \ldots, w'n) = \tag{40}$$
$$(2t_h * a'1 + w'1, , 2t_h * a'n + w'n)$$

The message acquisition part 112 in the signature generation apparatus 110 acquires a message M (step C4).

The signature generation part 115 in the signature generation apparatus 110 uses the second signing key x' to generate a signature σ for the message M.

$$\sigma \leftarrow \text{Sign}(x', M) \tag{41}$$

The transmission part 116 in the signature generation apparatus 110 transmits the message M, the second parameter s', the second verification key vk' and the signature σ to the verification apparatus 150 (step C6).

The verification apparatus 150 receives the second parameter s', the message M, the signature σ, and the second verification key vk' which are transmitted from the signature generation apparatus 110 and stores them in the storage part 152 (step D3).

The signature verification part 154 in the verification apparatus 150 verifies correctness of the pair of the message M and the signature σ using the second verification key vk' (step D4). The signature verification part 154 terminates a process if a verification result of the signature σ is non-acceptance ("No" branch in step D5).

If the verification result of the signature σ is acceptance ("Yes" branch in step D5), the signature verification part 154 in the verification apparatus 150 obtains a key difference Δ(=x−x') between the first signing key x and the second signing key x'. That is, the verification apparatus 150 set a value obtained by decoding a difference s−s' between the first parameter s and the second parameter s' as the key difference Δ (step D6).

$$\Delta \leftarrow \text{Decode}(s - s') \qquad (42)$$

An argument s−s' of a decoding function Decode is expressed as follows.

$$s - s' = (w1, \dots, wn) - (w'1, \dots, w'n) + ENC(x) - ENC(x') = \qquad (43)$$
$$(w1 - w'1, \dots, wn - w'n) + ENC(x - x')$$

When a difference between the first biometric information w and the second biometric information w' is less than or equal to an error correction capability of the linear code, the decoding function Decode absorbs $(w_1-w'_1, \dots, w_n-w'_n)$ and Decode(s−s') in Equation (42) becomes equivalent to $$DEC\ (ENC(x - x')) == x - x'$$

Therefore, Equation (42) becomes $$\Delta = x - x' \qquad (44)$$

As a non-limiting example, if a square lattice is used for encoding and $2t_h * \text{int}^{-1}( )$ is used as the encoding function Encode, the decoding function Decode may be $$\text{Decode}(c)=\text{int}(c/2t_h) \qquad (45)$$

In this case, Decode(s−s') is given by $$\text{int}\left[\frac{1}{2t_h}\left\{\left(w + 2t_h * \text{int}^{-1}(x)\right) - \left(w' + 2t_h * \text{int}^{-1}(x')\right)\right\}\right] = \qquad (46)$$
$$\text{int}\left\{\text{int}^{-1}(x - x') + \frac{1}{2t_h}(w - w')\right\}$$

For the first biometric information w and the second biometric information w', when $$d(n)^\infty(w, w') = \max\ \{|wi - w'i|, i = 1, \dots, n\} \le th \qquad (47)$$

holds, in Equation (46), each component of the n-dimensional vector $(w-w')/2t_h$ is all less than or equal to ±½, and Equation (46) is expressed as int(int⁻¹(x−x')). Then, the value Δ(integer) of Decode(s−s') in Equation (42) is $$\Delta = \text{int}\left(\text{int}^{-1}(x - x')\right) = x - x' \qquad (48)$$

The similarity verification part 156 in the verification apparatus 150 calculates d=s−s'−ENC(Δ) of Equation (27), which is a difference vector between the first biometric information w and the second biometric information w', and a norm of d (step D7).

$$d = (d1, \dots, dn) = \qquad (49)$$
$$(w1, \dots, wn) + ENC(x) - \{(w'1, \dots, w'n) + ENC(x')\} - ENC(\Delta) =$$
$$(w1, \dots, wn) - (w'1, \dots, w'n) + ENC(x - x') - ENC(\Delta) =$$
$$(w1 - w'1, \dots, wn - w'n)\ (\because\ ENC(x - x') = ENC(\Delta))$$

That is, under the linear code, Equation (27) corresponds to a vector subtraction of the first biometric information w and the second biometric information w'.

The similarity verification part 156 in the verification apparatus 150 calculates, for example, $L^2$ norm of d $$L2(d) = \sqrt{\sum_{i=1}^{n} d_i^2} = \sqrt{\sum_{i=1}^{n} (w_i - w'_i)^2} \qquad (50)$$

and terminates a process (step D11), if $L^2$ norm L2(d) of d is less than or equal to a predetermined threshold value (L2(d)≤Th) ("No" branch in step D8).

If $L^2$ norm L2(d) of d is less than or equal to the predetermined threshold value (L2(d) Th) ("Yes" branch in step D8), then the key difference verification part 157 in the verification apparatus 150 checks whether the key difference Δ(=x−x'), which is a difference between the first signing key x and the second signing key x', and the first verification key vk and the second verification key vk' conform to a relationship between a signing key and a verification key in a specified signature scheme (step D91).

$$\text{Key} - \text{Verify}(vk, vk', \Delta) \qquad (51)$$

For example, in Schnorr signature, Elgamal signature, and DSA (Digital Signing Algorithm) signature, for a generator g of multiplicative group Gp with prime order p, a positive integer smaller than p is selected at random as a secret key sk and a public key is given by $$vk - g^{sk} \bmod p \qquad (52)$$

(a mod p is a remainder of dividing a by p).

Therefore, from $vk=g^x \bmod p$ and $vk'=g^{x'} \bmod p$, when $vk/vk'=g(x-x')=g\Delta \bmod p$ (53)

holds, a function Key-Verify returns a conformance (e.g., 1), and when Equation (53) does not hold, the function Key-Verify returns a non-conformance (e.g., 0).

When the relationship between the key difference Δ(=x−x') and the first verification key vk and the second verification key vk' does not conform ("No" branch in step D10), the verification apparatus 150 terminates a process (step D11). When conforms ("Yes" branch in step D10), the verification apparatus 150 outputs a verification result of signature σ. When outputting a verification result, the verification apparatus 150 may also output an acceptance or rejection (non-acceptance) of signature σ, etc., a verification result of L2(d) and a verification result of the key difference.

The similarity verification part 156 in the verification apparatus 150 may use, for example, the Manhattan distance ($L^1$ norm) as a similarity between the first biometric information w and the second biometric information w' of n-dimensional vectors. In this case, the similarity verification part 156 calculates, instead of Equation (50), $L^1$ norm of d $$L1(d) = \sum_{i=1}^{n} |d_i| = \sum_{i=1}^{n} |w_i - w'_i| \qquad (54)$$

and checks whether L1(d) is less than or equal to a predetermined threshold value Th. The verification apparatus 150 terminates a process (step D11 in FIG. 5), if L1(d) is more than a predetermined threshold value (L1(d)<=Th) ("No" branch in step D8 in FIG. 5). If $L^1$ norm L1(d) of d is less than or equal to the predetermined threshold value Th ("Yes" branch in step D8), then the key difference verification part 157 in the verification apparatus 150 checks whether the key difference Δ(=x−x'), which is a difference between the first signing key x and the second signing key x', and the first verification key vk and the second verification key vk' conform to a relationship between a signing key and a verification key in a specified signature scheme (step D9 in FIG. 5). When conform, the verification apparatus 150 outputs a verification result (e.g., a verification result of the signature).

In implementation examples, the key generation apparatus 120 and the signature generation apparatus may be configured as client apparatuses 105 and the verification apparatus 150 may be configured as a server apparatus (cloud) or the like. In this case, the key generation apparatus 120 and the signature generation apparatus 110 may be arranged as a single unit or configured as separate units. According to the present example embodiment, risks of both loss and leakage of a key in a digital signature can be reduced simultaneously. Furthermore, it is possible to confirm the identity of two biometric information in the biometric signature with the same accuracy as biometric authentication. A verification of whether the first biometric information (registration biometric information) and the second biometric information (biometric information for signature) belong to the same person, where errors are absorbed in the encoding/decoding of the biometric signature, can be performed with the same accuracy as biometric authentication.

Figure 6:
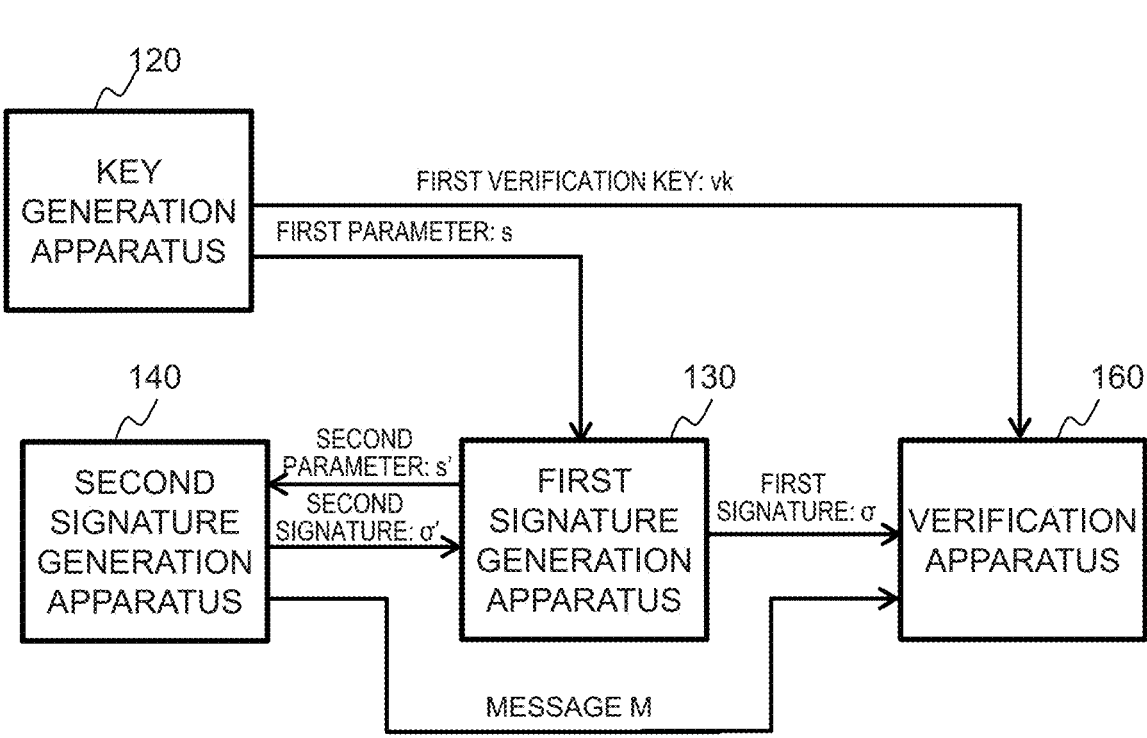
FIG. 6 is a diagram illustrating another one of example embodiments.

FIG. 6 is a diagram schematically illustrating an example of another one of example embodiments. Referring to FIG. 6, a digital signature system 100 includes a key generation apparatus 120, a first signature generation apparatus 130, a second signature generation apparatus 140, and a verification apparatus 160.

As in the above described one of example embodiments, in a key registration phase, the key generation apparatus 120 generates a pair of a first signing key x and a first verification key vk, where the first signing key x is a secret key and the first verification key vk is a public key. The key generation apparatus 120 acquires first biometric information w, applies an encoding function (encoding algorithm) (Encode) to the first signing key x to transform encoded key c←Encode(x) and composite the encoded key ENC(x) and the first biometric information w to generate a first parameter s.

$$s := ENC(x) + w \qquad (55)$$

The key generation apparatus 120 transmits the first verification key vk to the verification apparatus 160 and transmits the first parameter s to the first signature generation apparatus 130. It may be configured that the key generation apparatus 120, the first signature generation apparatus 130 and the verification apparatus 160 are communicatively connected via a network (e.g., at least one of a wired LAN (Local Area Network), a wireless LAN, a WAN (Wide Area Network), a mobile communication network, a virtual network, etc.). The key generation apparatus 120 transmits the first verification key vk to a key server (public key database), etc., and stored therein in association with a key ID, etc. The first signature generation apparatus 130 receives the first parameter s and stores it. The verification apparatus 160 receives the first verification key vk and stores it.

The first signature generation apparatus 130 generates a uniform random number Δ from an information source and makes it a differential key Δ. This differential key Δ is different from the key difference between the first signing key x and the second signing key x' described in equations (8), (9), (42), (44), etc. in the previous example embodiment.

The first signature generation apparatus 130 composites a value, obtained by applying the encoding function (Encode) to the differential key Δ, and the first parameter s from the key generation apparatus 120 to generate a second parameter s'.

$$s' := ENC(\Delta) + s \qquad (56)$$

The first signature generation apparatus 130 transmits the second parameter s' to the second signature generation apparatus 140. The first signature generation apparatus 130 and the second signature generation apparatus 140 are communicatively connected via a network (e.g., at least one of a wired LAN (Local Area Network), a wireless LAN, a WAN (Wide Area Network), a mobile communication network, a virtual network, etc.).

In a signing phase, the second signature generation apparatus 140 acquires second biometric information w' for a signature and a message M. The second signature generation apparatus 140 receives the second parameter s' transmitted from the first signature generation apparatus 130.

The second signature generation apparatus 140 generates a second signing key x' from the second parameter s' and the second biometric information w'. The second signature generation apparatus 140 makes a value x'(=DEC(s'−w') second signing key, where the value x' is obtained by applying a decoding function (Decode) to the difference s'−w' between the second parameter s' and the second biometric information w'. The second signing key x' is also referred to as a "temporary key".

The second signature generation apparatus 140 calculates $$d = s' - w' - ENC(x') \qquad (57)$$

from a difference s'−w' between the second parameter s' and the second biometric information w' and an encoded value ENC(x') of the second signing key x', and checks whether or not a value corresponding to a difference between the first biometric information w and the second biometric information w' satisfies a predetermined specified condition. As a specified condition, a condition that a norm of d is within a predetermined specified range (e.g., less than or equal to a threshold value) can be used. The second signature generation apparatus 140 terminates a process, if the norm of d does not satisfy the specified condition.

If the norm of d satisfies the specified condition, the second signature generation apparatus 140 generates a second signature $$\sigma' \leftarrow \text{Sign}(x', M) \quad (58)$$

for a message M generated using the second signing key x' and transmits the second signature σ' to the first signature generation apparatus 130. The second signature generation apparatus 140 transmits the message M to the verification apparatus 160.

The first signature generation apparatus 130 uses the second signature σ'(=Sign(x',M)) and the differential key Δ to generate a first signature σ(=Sign(x,M)) for message M with the first signing key x from the second signature σ'(=Sign(x',M)) for message M with the second signing key x' by a Key Homomorphic operation KHom(Δ,σ').

$$\sigma(= \text{Sign}(x, M)) \leftarrow KHom(\Delta, \sigma') \quad (59)$$

The first signature generation apparatus 130 transmits the first signature σ=Sign(x,M) to the verification apparatus 160. It is configured that the first signature generation apparatus 130 and the verification apparatus 160 are communicatively connected via a network (e.g., at least one of a wired LAN (Local Area Network), a wireless LAN, a WAN (Wide Area Network), a mobile communication network, a virtual network, etc.)

The verification apparatus 160 verifies the first signature σ (=Sign(x,M)) for the message M(correctness of a pair of the message M and the first signature σ), using the verification key vk.

$$\text{Verify}(vk, M, \sigma) \quad (60)$$

As a result of verification, Verify ( ) outputs (returns) 1 if the first signature σ is accepted and outputs (returns) 0 if the first signature σ is rejected (non-accepted). The verification apparatus 160 may transmit the verification result, for example, to a first signature generation apparatus 130 of a transmission source.

Figure 7:
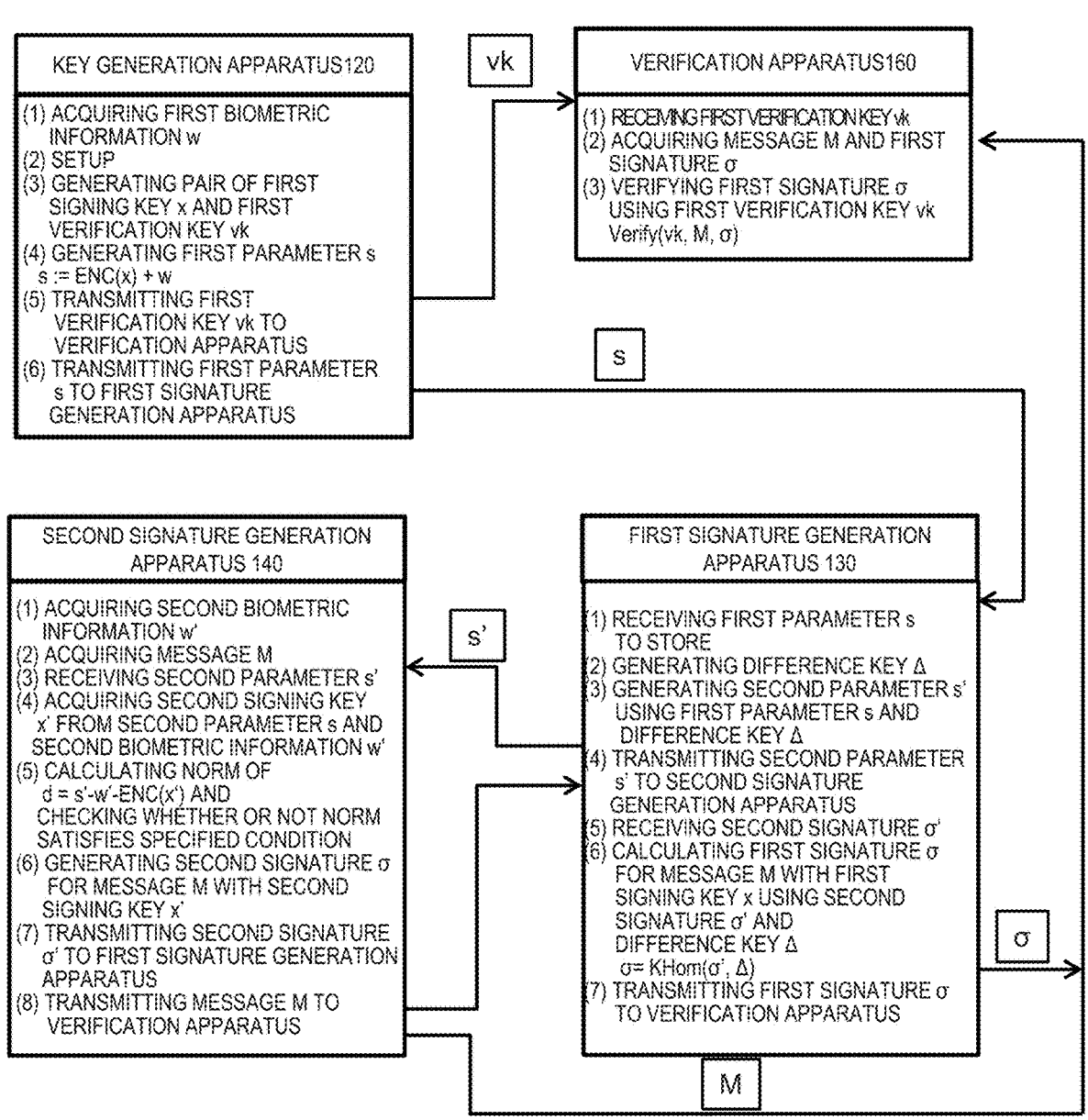
FIG. 7 is a diagram illustrating an operation process in another one of example embodiments.

FIG. 7 illustrates operation processes in each of the above apparatuses described with reference to FIG. 6. Some overlap with the explanation above, but operations are supplemented below.

As in the previous example embodiment, the key generation apparatus 120 performs a key generation algorithm for a digital signature scheme. The key generation apparatus 120 acquires first biometric information w for registration. The key generation apparatus 120 decides a parameter (public parameter) pp in advance according to a security parameter κ and makes it available to a user (setup) (2).

$$pp \leftarrow \text{Setup}(1^\kappa) \quad (61)$$

The key generation apparatus 120 generates a pair of a first signing key x and a first verification key vk corresponding to the first signing key x according to the public parameter pp (3).

The key generation apparatus 120 encodes the first signing key x and converts it into an encoded key, then composites the encoded key ENC(x) and the first biometric information w to generate a first parameter s (4).

$$s := ENC(x) + w \quad (62)$$

The key generation apparatus 120 transmits the first verification key vk to the verification apparatus 160 (5) and transmits the first parameter s to the first signature generation apparatus 130 (6).

The first signature generation apparatus 130 obtains the first parameter s and stores it (1). The first signature generation apparatus 130 generates a differential key Δ (step 2), then a second parameter s' from the first parameter s and the differential key Δ (step 3).

$$s' := s + ENC(\Delta) \quad (63)$$

The first signature generation apparatus 130 transmits the second parameter s' to the second signature generation apparatus 140 (step 4).

The second signature generation apparatus 140 acquires second biometric information w' for signature of user (step 1) and further obtains a message M (step 2).

The second signature generation apparatus 140 obtains a second parameter s' (step 3), and makes a value $$x' \leftarrow \text{Decode}(s' - w') \quad (64)$$

obtained by applying a decoding function Decode to a difference s'−w' between the second parameter s' and the second biometric information w' a second signing key x'.

Since individual values of ENC(x) and ENC(Δ) are not given to the second signature generation apparatus 140, the second signature generation apparatus 140 cannot know these values directly. Therefore, the second signature generation apparatus 140 calculates a second signing key x'(=x+ Δ) from Equation (64).

The difference s'−w' in Equation (64) includes a composite value (ENC(x)+ENC(Δ)) of ENC(x), which is an encoded value of the first signing key x, and ENC(Δ), which is an encoded value of the differential key Δ, and a difference (w−w') between the first biometric information w and the second biometric information w'.

$$s' - w' = s + ENC(\Delta) - w'$$
$$= ENC(x) + w + ENC(\Delta) - w'$$
$$= ENC(x + \Delta) + (w - w') \quad (65)$$

From Equation (65), if the first biometric information w and the second biometric information w' are close enough, i.e., the difference (w−w') is within a correction capability, a result of inputting s'−w' to the decoding function Decode is $$x' \leftarrow \text{Decode}(s' - w') = DEC(ENC(x + \Delta)) = x + \Delta$$

The second signing key x' is given by $$x' = x + \Delta \tag{66}$$

That is, the second signing key x' becomes a value obtained by shifting the first signing key x by the differential key Δ. The differential key Δ is also called a shift amount.

The second signature generation apparatus 140 calculates $$d = s' - w' - ENC(x') \tag{67}$$

from a difference s'−w' between the second parameter s' and the second biometric information w' and an encoded value ENC(x') of the second signing key x', and checks whether or not d satisfies a predetermined specified condition. The second signature generation apparatus 140 terminates a process, if d does not satisfy the specified condition. Equation (67) can be expanded as follows, where d is a vector value corresponding to the difference w−w' between the first biometric information w and the second biometric information w'.

$$
\begin{aligned}
d &= s' - w' - ENC(x') \tag{68}\\
&= s + ENC(\Delta) - w' - ENC(x')\\
&= w + ENC(x) + ENC(\Delta) - w' - ENC(x')\\
&= w - s' + ENC(x + \Delta) - ENC(x')\\
&= w - w' \; (\because \; ENC(x + \Delta) = ENC(x'))
\end{aligned}
$$

If the norm (e.g., $L^2$ norm L2(d)) of the difference d between the first biometric information w and the second biometric information w' does not satisfy the specified condition, the second biometric information w' is not the biometric information of the same person as the first biometric information w, the second signature generation apparatus 140 rejects (terminates the process). It is the same as the previous example embodiment. The specified condition is, for example, that a similarity in a vector space (e.g., Euclidean distance or cosine similarity) between the first biometric information w and the second biometric information w' is not within a predetermined specific range. The reason for rejection is as follows as the previous example embodiment. If the range of the biometric information that should be evaluated as the biometric information of the same person is different from the difference absorbed by the correction capability of the code, the difference between the two biometric information may be absorbed by the correction capability of the code even though a signature has been generated using biometric information that should be evaluated as a different person than at the time of key generation. In such cases, it can avoid accepting the signature by adding this rejection process.

The second signature generation apparatus 140 calculates a second signature:

$$\sigma' \leftarrow \text{Sign}(x', M) \tag{69}$$

for a message M by second signing key x'(=x+Δ) and transmits the second signature σ' to the first signature generation apparatus 130. The second signature generation apparatus 140 transmits the message M to the verification apparatus 160.

The first signature generation apparatus 130 receives the second signature σ', uses the second signature σ' and the differential key Δ to calculate a first signature σ(=Sign(x,M)) for message M with the first signing key x, by a Key Homomorphic operation KHom(Δ,σ'). (step 6).

$$\sigma \leftarrow KHom(\Delta, \sigma') \tag{70}$$

The first signature generation apparatus 130 transmits the first signature σ to the verification apparatus 160 (step 7).

The key homomorphic operation σ←KHom(Δ,σ') in Equation (70) indicates that an algorithm that generates signature σ with the first signing key x for message M from the second signature σ' and the differential key Δ can be configured.

The following outlines a key homomorphic scheme. As an example, it is explained using a Schnorr signature having a key homomorphic property (see NPL 2). In the following, a secret key sk and a public key pk of NPL 2 are denoted as a signing key sk and a verification key vk, respectively.

Example 1: Schnorr Signature

Setup

In Setup (1$^\kappa$), a group G of order p, where p is a prime number with K bits (κ is a security parameter), is selected, wherein p satisfies $$\kappa = \lceil \log_2 p \rceil$$

and [ ] represents a ceiling function for rounding up to integer values. Then, g is selected uniformly at random from G (g←$^R$ G), hash function H:G×{0, 1}*→{0, 1}$^n$ is selected uniformly at random from a hash function family {H$_k$}$_k$, and (G,g,H) is to be a public parameter pp.

$$pp \leftarrow (G, g, H) \tag{71}$$

Key Generation:

In KeyGen(pp), a signing key and a verification key are generated according to the public parameter pp. x is selected uniformly at random from Z$_p$ (set of integers between 0 and p, exclusive of p (=Z/pZ)) (x←$^R$ Z$_p$). The verification key and the signing key are decided as follows, respectively and are outputted.

verification key: $vk \leftarrow g^x$, signing key: $sk \leftarrow x$ \hfill (72)

Signing:

In Sign(sk, M), r is selected uniformly at random from $Z_p(r \xleftarrow{R} Z_p)$ and a signature σ calculated as follows is outputted.

$$c \leftarrow H(g^r, M) \tag{73}$$

$$y \leftarrow r + x \cdot c \bmod p$$

$$\sigma \leftarrow (c, y)$$

Verification:

If $c = H(((g^x)^{-c} g^y), M)$      (74)

holds, Verify(vk,M,σ) outputs(returns) 1, else outputs (returns) 0.

Key Homomorphic Operation:

If the signature σ←Sign(sk,M)=(c,y) is a correct signature for message M under a verification key vk, a new signature calculated using a and a differential key Δ:

$$\sigma' \leftarrow (c, y') \tag{75}$$

$$y' \leftarrow y + c \cdot \Delta \bmod p$$

is found to be a correct signature for the message M under the verification key:

$$vk' = g^{x+\Delta} \tag{76}$$

In other words, the followings hold.

$$H((vk')^{-c} g^{y'}, M) = \tag{77}$$

$$H\left(\left(g^{x+\Delta}\right)^{-c} g^{(y+c\cdot\Delta)}, M\right) = H\left(g^{x\cdot(-c)+\Delta\cdot(-c)} g^{(r+x\cdot c+c\cdot\Delta)}, M\right) = H(g^r, M) = c$$

Note that NPL 2 discloses the algorithm Adapt, which includes a conversion process that converts signature σ with a signing key sk to a signature σ' with a signing key sk+Δ. In the present example embodiment, an algorithm for converting the second signature σ' with the signing key sk+A to a signature σ with a signing key (sk+Δ)−Δ is called KHom. KHom does not correspond to the Adapt in NPL 2, but it can be made to correspond to a shift Δ of the transformation process in Adapt with −Δ.

The verification apparatus 160 receives the first signature σ from the first signature generation apparatus 130, receives the message M from the second signature generation apparatus 140, and verifies correctness of a pair of the message M and the first signature σ using the verification key vk.

When a message M is used in the key homomorphic operation KHom(Δ,σ') in Equation (70), the first signature generation apparatus 130 may receive the message M together with the second signature σ' from the second signature generation apparatus 140. In this case, the first signature generation apparatus 130 transmits the message M together with the first signature σ to the verification apparatus 160.

Figure 8:
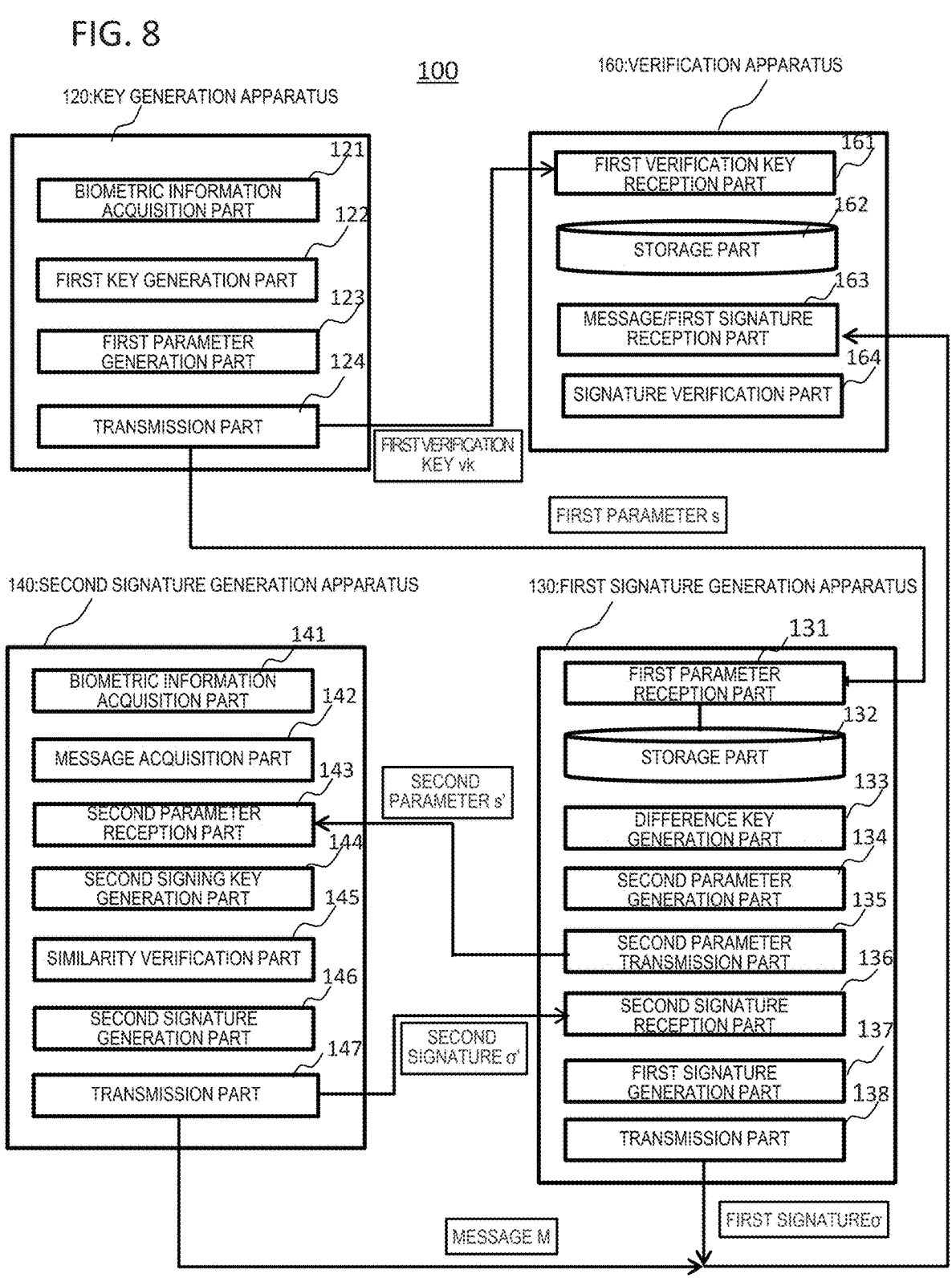
FIG. 8 is a diagram illustrating a configuration in another one of example embodiments.

FIG. 8 is a diagram illustrating an example of a configuration of each apparatus in FIG. 6. The key generation apparatus 120 includes a biometric information acquisition part 121, a first key generation part 122, a first parameter generation part 123 and a transmission part 124. The biometric information acquisition part 121 includes a sensor (not shown) to acquire first biometric information w of user (or includes an interface to receive the first biometric information w acquired by an external sensor via a network such as a communication line). The first key generation part 122 generates a pair of a first signing key x and a first verification key vk. The first parameter generation part 123 composites a first parameter s from the first signing key x and the first biometric information w. The transmission part 124 transmits the first verification key vk to the verification apparatus 160 and transmits the first parameter s to the first signature generation apparatus 130.

The first signature generation apparatus 130 includes a first parameter reception part 131, a storage part 132, a differential key generation part 133, a second parameter generation part 134, a second parameter transmission part 135, a second signature reception part 136, a first signature generation part 137, and a transmission part 138. The first parameter reception part 131 receives the first parameter s transmitted from the key generation apparatus 120. The storage part 132 stores the first parameter s obtained by the first parameter reception part 131. The differential key generation part 133 generates a differential key Δ. The second parameter generation part 134 generates a second parameter s'. The second parameter transmission part 135 transmits the second parameter s' to the second signature generation apparatus 140. The second signature reception part 136 obtains a second signature σ' from the second signature generation apparatus 140. The first signature generation part 137 uses the second signature σ' and the differential key Δ to generate a first signature σ for message M with the first signing key x. The transmission part 138 transmits the message M and the first signature σ to the verification apparatus 160.

The second signature generation apparatus 140 includes a biometric information acquisition part 141, a message acquisition part 142, a second parameter reception part 143, a second signing key generation part 144, and a similarity verification part 145. The biometric information acquisition part 141 includes a sensor (not shown) to acquire second biometric information w' of a user. The message acquisition part 142 acquires a message M to be signed. The second parameter reception part 143 receives the second parameter s'. The second signing key generation part 144 generates a second signing key x' from the second parameter s' and the second biometric information w'. The similarity verification part 145 calculates a similarity between the first biometric information w and the second biometric information w' and verifies whether or not the second biometric information w' and the first biometric information w are from the same person. The similarity verification part 145 may use $L^2$ norm of a difference between the first biometric information w and the second biometric information w' as the similarity between the first biometric information w and the second biometric information w', as described above. In this case, the similarity verification part 145 may obtain a difference (vector) d between the first biometric information w and the second biometric information w' by d=s−s'−ENC (Δ), calculate the L2 norm of d, and verify whether or not L2(d) satisfies the specified condition. The second signature generation apparatus 140 is further provided with a second signature generation part 146 and a transmission part 147. The second signature generation part 146 generates a second signature σ' for a message M with the second signing key x' if L2(d) satisfies the specified condition. The transmission part 147 transmits the second signature σ' to the first signature generation apparatus 130. The sensor (not shown) in biometric information acquisition part 141 has the same configuration as the sensor (not shown) in biometric information acquisition part 121 of the key generation apparatus 120. The transmission part 147 transmits the message M to the verification apparatus 160. If a process in the first signature generation apparatus 130 requires the message M, the transmission part 147 may transmit the message M together with the second signature σ' to the first signature generation apparatus 130, and the first signature generation apparatus 130 may transmit the message M together with the first signature σ to the verification apparatus 160.

The verification apparatus 160 includes a first verification key reception part 161, a storage part 162, a message/first signature reception part 163, and a signature verification part 164. The first verification key reception part 161 receives the first verification key vk generated in the key generation apparatus 120. The storage part 162 stores the first verification key vk received. The message/first signature reception part 163 acquires the message M from the second signature generation apparatus 140 (or the first signature generation apparatus 130) and obtains the first signature σ from the first signature generation apparatus 130. The signature verification part 164 verifies correctness of a pair of the message M and the first signature σ using the first verification key vk.

Figure 9:
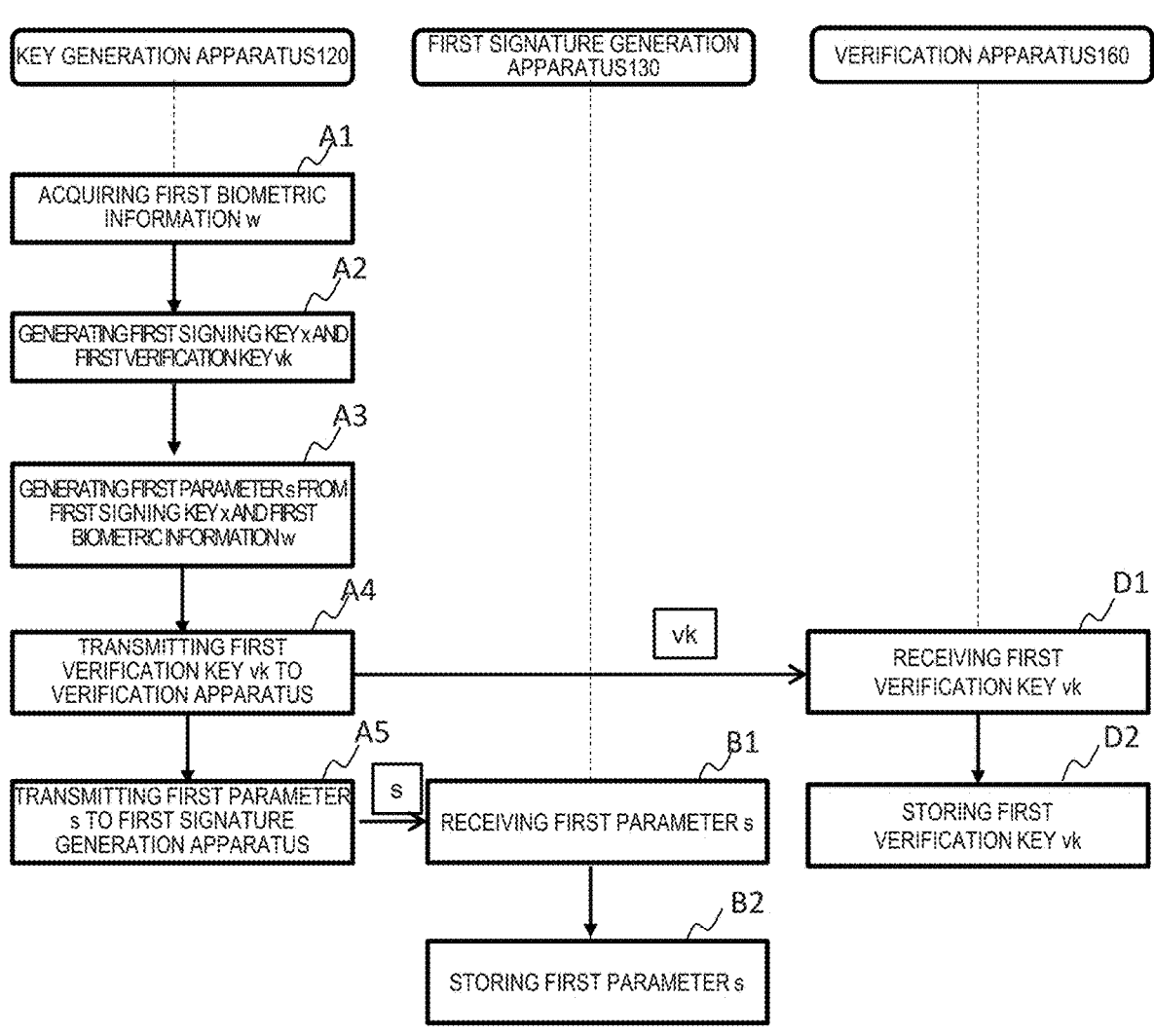
FIG. 9 is a diagram illustrating a process sequence in one of example embodiments.

FIG. 9 is a diagram illustrating an example of processing operations in a key registration phase in the system 100 illustrated in FIG. 8. Steps A1 to A3 in key generation apparatus 120 are the same as in FIG. 4.

The transmission part 124 in the key generation apparatus 120 transmits the first verification key vk to the verification apparatus 160 (step A4) and the first parameter s (=ENC (x)+w) to the first signature generation apparatus 130 (step A5). The key generation apparatus 120 may upload the verification key vk to a key server or the like and publish it on the Internet or the like.

The first verification key reception part 161 in the verification apparatus 160 obtains the first verification key vk (step D1) and stores it in the storage part 162 (step D2). The first parameter reception part 131 in the first signature generation apparatus 130 obtains the first parameter s (step B1) and stores it in the storage part 132 (step B2). Here, as a non-limiting example, it is explained according to an example using a square lattice as an encoding (e.g., PTL 2). As mentioned above, when the first parameter s is applied to the first signing key x with the encoding function Encode( ) as $2t_h * \mathrm{int}^{-1}( )$, $$(a1, \ldots, an) \leftarrow \mathrm{int}^{-1}(x) \tag{78}$$

The encoded key c, which is obtained encoding the first signing key x, is an n-dimensional vector and is given by follows.

$$c = (c1, \ldots, cn) \leftarrow \mathrm{Encode}(x) = 2t_h * \mathrm{int}^{-1}(x) = 2t_h * (a1, \ldots, an) \tag{79}$$

Thus, the first parameter s in Equation (59) is given by follows.

$$s := \mathrm{ENC}(x) + w = (c1, \ldots, cn) + (w1, \ldots, wn) = \tag{80}$$
$$2t_h * (a1, \ldots, an) + (w1, \ldots wn) = (2t_h * a1 + w1, \ldots, 2t_h * an + wn)$$

Figure 10:
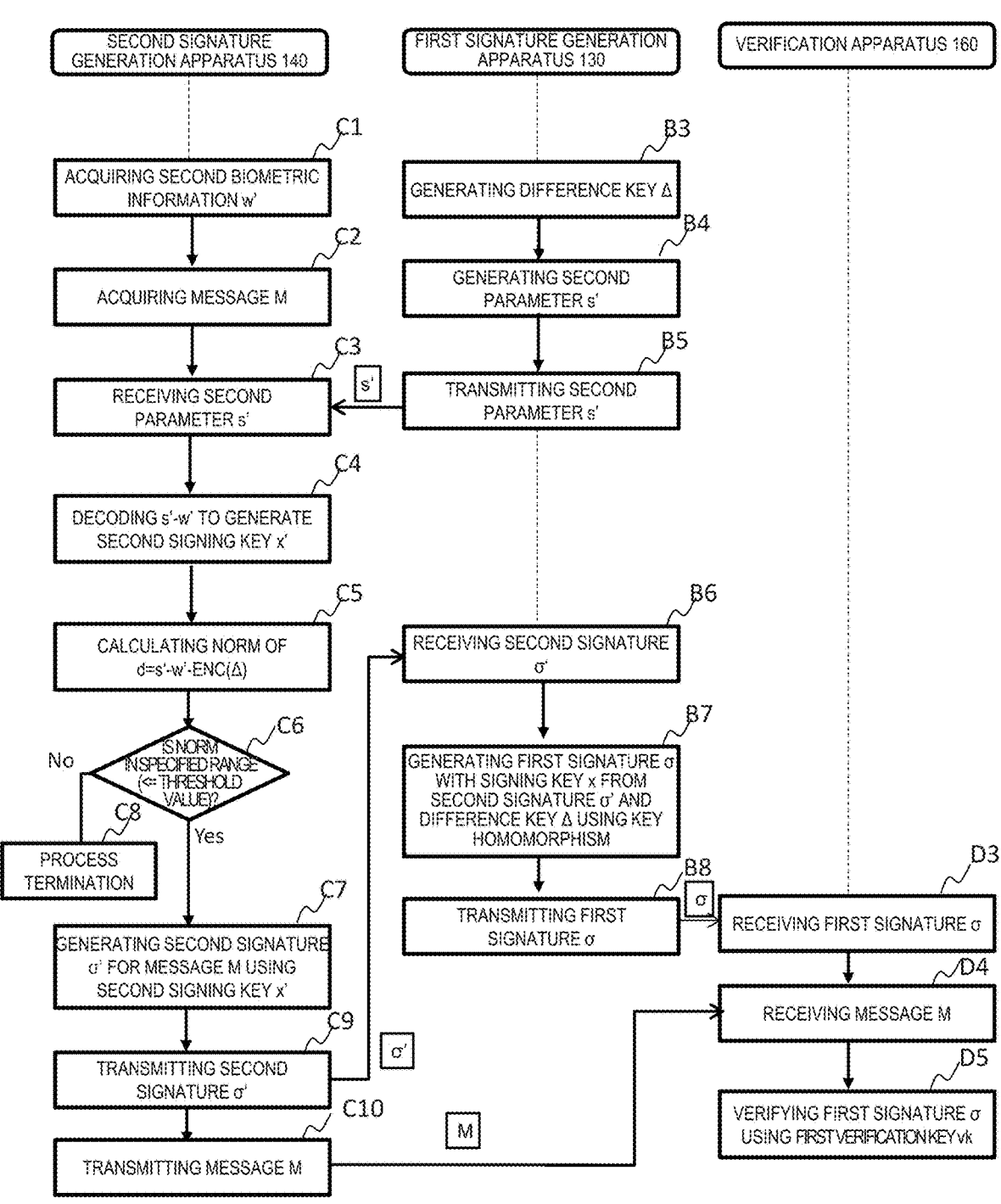
FIG. 10 is a diagram illustrating a process sequence in one of example embodiments.

FIG. 10 is a diagram illustrating an example of processing operations in a signature generation stage and a verification stage in the system 100 illustrated in FIG. 8.

The differential key generation part 133 in the first signature generation apparatus 130 generates a random number Δ and makes it a differential key Δ (step B3).

The second parameter generation part 134 in the first signature generation apparatus 130 performs a composite operation according to Equation (60) on an encoded value ENC(Δ) encoding the differential key Δ and the first parameter s to generate a second parameter s' (step B4).

$$s' := \mathrm{ENC}(\Delta) + s = \mathrm{ENC}(\Delta) + \mathrm{ENC}(x) + w \tag{81}$$

When the differential key Δ (integer) is input into the inverse function $\mathrm{int}^{-1}( )$, an n-dimensional vector $\Delta^{(n)}$ is obtained.

$$\Delta^{(n)} = (\Delta1, \ldots, \Delta n) \leftarrow \mathrm{int}^{-1}(\Delta) \tag{82}$$

If an encoding function Encode( ) is set to $2t_h * \mathrm{int}^{-1}( )$, then encoded key c', which encodes the differential key Δ, becomes an n-dimensional vector and is given below.

$$c' = (c'1, \ldots, c'n) \leftarrow \mathrm{Encode}(\Delta) = 2t_h * \mathrm{int}^{-1}(\Delta) = 2t_h * (\Delta1, \ldots, \Delta n) \tag{83}$$

Thus, the first parameter s is given by follows.

$$s' := \mathrm{ENC}(\Delta) + s = \tag{84}$$
$$2t_h * (\Delta1, \ldots, \Delta n) + 2t_h * (a1, \ldots, an) + (w1, \ldots, wn) =$$
$$2t_h * (a1 + \Delta1, \ldots, an + \Delta n) + (w1, \ldots, wn)$$

The second parameter transmission part 135 in the first signature generation apparatus 130 transmits the second parameter s' to the second signature generation apparatus 140 (step B5).

In a signing phase, the biometric information acquisition part 141 in the second signature generation apparatus 140 acquires second biometric information w' for signature of user (step C1).

The message acquisition part 142 in the second signature generation apparatus 140 acquires message M (step C2).

The second parameter reception part 143 in the second signature generation apparatus 140 receives the second parameter s' transmitted from the first signature generation apparatus 130 (step C3).

The second signing key generation part 144 in the second signature generation apparatus 140 decrypts a difference:

s'−w' between the second parameter s' and the second biometric information w' and makes it a second signing key x' (step C4).

$$x' \leftarrow \text{Decode}(s' - w') \tag{85}$$

The argument (s'−w') of the decoding function Decode is expanded from equations (79) and (83) as follows.

$$
\begin{aligned}
s' - w' &= s + ENC(\Delta) - w' \tag{86}\\
&= ENC(x) + w + ENC(\Delta) - w'\\
&= ENC(x + \Delta) + w - w'\\
&= (c1 + c'1, \dots, cn + c'n) + (w1 - w'1, \dots, wn - w'n)
\end{aligned}
$$

If a difference between w and w' is within a correction capability of decoding function Decode, then from Equation (86)

$$\text{Decode}(s' - w') = DEC(ENC(x + \Delta)) = x + \Delta$$

and following holds.

$$x' \leftarrow x + \Delta \tag{87}$$

As a non-limiting example, if a square lattice is used for encoding and $2t_h * \text{int}^{-1}()$ is used as an encoding function Encode, the decoding function Decode may be $$\text{Decode}(c) = \text{int}(c/2t_h) \tag{88}$$

In this case, Decode(s−w') is given by $$\text{int}\left[\frac{1}{2t_h}\left\{2t_h * \left(\text{int}^{-1}(x) + \text{int}^{-1}(\Delta)\right) + w - w'\right\}\right] = \tag{89}$$

$$\text{int}\left\{\text{int}^{-1}(x + \Delta) + \frac{1}{2t_h}(w - w')\right\}$$

For the first biometric information w and the second biometric information w', when $$d(n)_\infty(w, w') = \max\{|wi - w'i|, i = 1, \dots, n\} \le th \tag{90}$$

holds, in Equation (89), each component of the n-dimensional vector (w−w')/2t_h is all less than or equal to ±½, and Equation (89) becomes int(int⁻¹(x+Δ)). Then, the value x' of Decode(s'−w') in Equation (85) is $$x' = \text{int}(\text{int} - 1(x + \Delta)) = x + \Delta \tag{91}$$

The similarity verification part 145 in the second signature generation apparatus 140 calculates $$d = s' - w' - ENC(x') \tag{92}$$

from the second parameter s', the second biometric information w' and ENC(x'), which is an encoded value of the second signing key x', and verifies whether or not d satisfies a specified condition (step C5). Equation (92) is expressed as follows.

$$
\begin{aligned}
d &= (d1, \dots, dn) \tag{93}\\
&= ENC(x) + (w1, \dots, wn) + ENC(\Delta) - (w'1, \dots, w'n) - ENC(x')\\
&= (w1, \dots, wn) - (w'1, \dots, w'n) + ENC(x + \Delta) - ENC(x')
\end{aligned}
$$

For first biometric information w and the second biometric information w', if Equation (90) holds, x'=x+Δ (Equation (91)) holds, therefore, $$
\begin{aligned}
d &= (w1, \dots, wn) - (w'1, \dots, w'n) + ENC(x + \Delta) - ENC(x + \Delta) = \tag{94}\\
&\quad (w1, \dots, wn) - (w'1, \dots, w'n) = (w1 - w'1, \dots, wn - w'n)
\end{aligned}
$$

That is, under linear code, Equation (92) corresponds to a difference between the first biometric information w and the second biometric information w' (a vector subtraction).

If the norm of the difference d between the first biometric information w and the second biometric information w' does not satisfy the specified condition ("No" branch in step C6), the second signature generation apparatus 140 terminates the process (step C8).

If the norm of the difference d between the first biometric information w and the second biometric information w' satisfies the specified condition ("Yes" branch in step C6), the second signature generation part 146 in the second signature generation apparatus 140 generates a second signature:

$$\sigma' = \text{Sign}(x', M) \tag{95}$$

for the message M using the second signing key x' (step C7).

The transmission part 147 in the second signature generation apparatus 140 transmits the second signature σ' to the first signature generation apparatus 130 (step C9). The transmission part 147 in the second signature generation apparatus 140 transmits the message M to the verification apparatus 160 (step C10). The order of steps C9 and C10 can be reversed.

The second signature reception part 136 in the first signature generation apparatus 130 receives the second signature σ' transmitted from the second signature generation apparatus 140 (step B6).

The first signature generation part 137 in the first signature generation apparatus 130 uses the second signature σ' and the differential key Δ to generate the first signature σ for the message M with the first signing key x from the second signature σ' for the message M with second signing key x', according to Key homomorphic operation σ←KHom(Δ,σ') (step B7).

The transmission part 138 in the first signature generation apparatus 130 transmits the first signature σ to the verification apparatus 160 (step B8).

The message/first signature reception part 163 in the verification apparatus 160 receives the first signature σ transmitted from the first signature generation apparatus 130 (step D3) and receives the message M transmitted from the second signature generation apparatus 140 (step D4). The signature verification part 164 in the verification apparatus 160 uses the first verification key vk to verify correctness of the pair of the message M and the first signature σ (step D5). The first signature generation apparatus 130 may receive the message M from the second signature generation apparatus 140 and the first signature generation apparatus 130 may transmit the message M together with the first signature σ to the verification apparatus 160.

The verification apparatus 160 may transmit the verification results (acceptance/non-acceptance notification) to the first signature generation apparatus 130 of a transmission source, if necessary.

The timing of the verification process is arbitrary. For example, by verifying a signature that is stored with a message M when the message M is to be used, it is possible to verify that the message M has not been altered inclusive of time period during when it was stored. A pair of the message M and the signature may be verified a plurality of times.

The first signature generation apparatus 130 may transmit the first signature σ generated to the second signature generation apparatus 140 and the second signature generation apparatus 140 may transmit the message M and the first signature σ to the verification apparatus 160.

The Key homomorphic operation algorithms includes not only σ←KHom(Δ,σ) corresponding to the signing algorithm, but also an algorithm including Δ, σ and message M, as in Equation (96) (NPL 2: 4.7 Randomizable SPS by Abe et al.), or an algorithm including Δ, σ, M and the verification key vk, as in Equation (97) (NPL 2: 4.8 Ghadafi's Short SPS). Where, the key homomorphic operation algorithm is an algorithm that transforms the second signature σ' for message M with the second signing key x' to the first signature σ for message M with the first signing key x(=x'+Δ). In this case, the second signature generation apparatus 140 transmits the message M together with the second signature σ' to the first signature generation apparatus 130.

$$\sigma \leftarrow KHom(\Delta, \sigma', M) \tag{96}$$

$$\sigma \leftarrow KHom(\Delta, \sigma', M, vk) \tag{97}$$

The similarity verification part 145 in the second signature generation apparatus 140 may use, for example, the Manhattan distance ($L^1$ norm) as a similarity between the first biometric information w and the second biometric information w' of n-dimensional vectors. In this case, the similarity verification part 145 calculates, instead of Equation (50), $L^1$ norm of d $$L1(d) = \sum_{i=1}^{n} |d_i| = \sum_{i=1}^{n} |w_i - w_i'| \tag{98}$$

(step C5 in FIG. 10) and checks whether L1(d) is less than or equal to a predetermined threshold value Th1. The similarity verification part 145 terminates a process, if L1(d) is more than a predetermined threshold value (L1(d)<=Th1) ("No" branch in step C6 in FIG. 10). If $L^1$ norm L1(d) of d is less than or equal to the predetermined threshold value Th1 ("Yes" branch in step C6 in FIG. 10), then the second signature generation part 146 in the second signature generation apparatus 140 generates the second signature σ' for the message M using the second signing key x' (step C7 in FIG. 10).

According to the present example embodiment, instead of using only biometric information to generate signatures, one of the two signing keys, which are distributed and possessed by two parties, is replaced with biometric information. Since a signing key generated from biometric information is used in a pair with another signing key, it is possible to associate a single biometric modality (e.g., face, fingerprint, finger vein, iris, etc.) with multiple keys by changing the another signing key. The storage of other signing keys that are paired with biometric information may be a computer, smartphone, token, IC card, or other device in the user's hands, a cloud server, or a server managed by a service provider. According to the present example embodiment, it is possible to reduce both risks of loss and leakage of a key in digital signatures simultaneously. According to the present example embodiment, the last process for completion of the signature is performed by the user-side (client) device. Therefore, even if a device on the server-side cheats in generating the signature, it can be detected when the device uses parameters other than those indicated by transmitting the completed signature after verifying it.

Figure 12A:
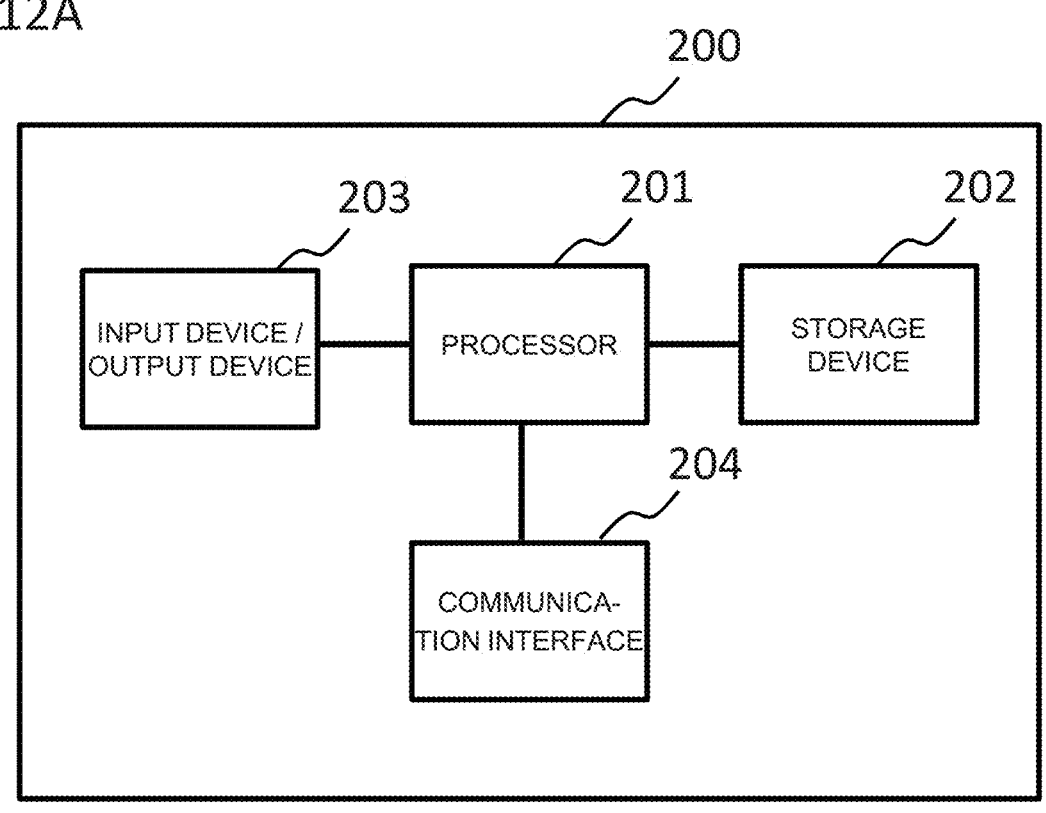
FIGS. 12A and 12B are diagrams illustrating one of implementation examples.

FIG. 12A is a schematic diagram illustrating an example in which each apparatus (110, 120, 150, or 120, 130, 140, 160) of the above digital signature system 100 is implemented on a computer that has communication functions and can be connected to each other via a network. In FIG. 12A, each apparatus (110, 120, 150, or 120, 130, 140, 160) includes a processor 201, a storage device 202, an input device/output device 203, and a communication interface 204. Storage device 202 may be configured with a RAM (Random Access Memory), a ROM (Read Only Memory), or a semiconductor storage such as EEPROM (Electrically Erasable and Programmable ROM), HDD (Hard Disk Drive), CD (Compact Disc), DVD (Digital Versatile Disc), etc. a Disk Drive (HDD), a Compact Disc (CD), a Digital Versatile Disc (DVD), etc. The processor 201 executes programs (not shown) stored in the storage device 202 to realize processing and functions of each device. The input device/output device 203 may be configured with a keyboard and display. For example, the first signature generation apparatus 130 may be configured to display the verification results (acceptance or non-acceptance) from the verification apparatus 160 on an output device such as a display. In the key generation apparatus 120, signature generation apparatus 110, first signature generation apparatus 130, and second signature generation apparatus 140, which acquire biometric information, the input device/output device 203 may be configured with a sensor to acquire biometric information. In this case, the sensor may be an image sensor (camera) if the biometric information is a face, iris, etc., a fingerprint sensor if the biometric information is a fingerprint, or a LED (Light Emitting Diode) that emits near-infrared light and a near-infrared camera that captures light transmitted through the finger, for example, in the case of finger veins. The sensor may be a removable sensor, such as a Universal Serial Bus (USB) device. Communication interface 204 may be provided with a network interface card, transceiver, etc., and may be configured to communicate with each other via LAN (Local Area Network), WAN (Wide Area Network) such as the Internet, wireless LAN, mobile communication network, etc. In the key generation apparatus 120, signature generation apparatus 110, and first signature generation apparatus 130, the communication interface 204 may be configured to have an interface that communicates and connects to an external sensor (e.g., a sensor connected through Bluetooth (registered trademark), etc.) and receives biometric information acquired by the external sensor.

Figure 12B:
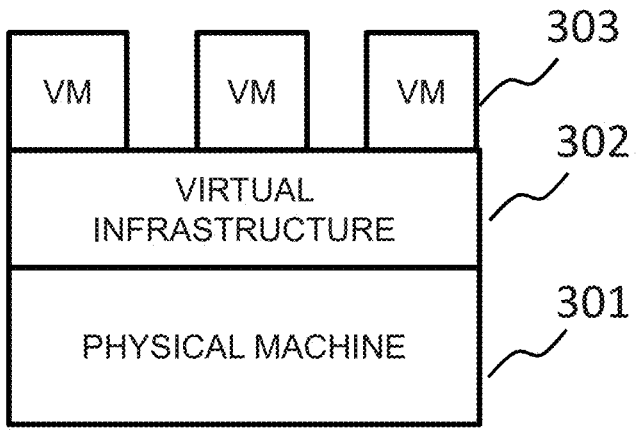

FIG. 12B schematically illustrates an example of implementing the apparatuses (110, 120, 150, or 120, 130, 140, 150) in the digital signature system 100 described above as virtual machines using server virtualization technology. A plurality of virtual machines VMs run on a virtual infrastructure 302 such as a hypervisor implemented on a physical machine 301 of a server. One or more of the apparatuses in the digital signature system 100 (110, 120, 150, or 120, 130, 140, 160) may be implemented as a virtual machine VM. It provides a virtual server environment with a plurality of servers running, although physically it is a single server. Each virtual machine VM is preferably configured to operate in an isolated environment in memory space. In this case, in the virtual machine VM, the program that realizes the processing of one of the apparatuses (110, 120, 130, 140, 150, 160) runs on a virtual OS (Operating System) on the virtual machine. The virtual machine VM that virtually realizes any of the apparatuses (110, 120, 130, 140, 150, 160) may be configured to communicate and connect with other virtual machines via a virtual network, or it may be configured to communicate and connect with other apparatus(es) among the apparatuses (110, 120, 130, 140, 150, 160) through a physical interface (communication interface) of the physical machine 301 via a LAN, WAN such as the Internet, etc.

With respect to equations (37), (40), (80), (84), etc., the use of a square lattice as the encoding is described as a non-limiting example, but it is of course possible to use RS codes, BCH codes, or other error-correcting codes as the encoding. In addition, biometric information is not limited to real number vectors, but integer vectors may also be used, as a matter of course.

In the above example embodiments, a system for processing based on biometric information is described as an example, but this disclosure is not limited to biometric information and can also be realized using fuzzy information other than biometric information. For example, it may be applied to PUF (Physically Unclonable Function), etc. PUF is a physical duplication prevention function that identifies semiconductor devices (IC (Integrated Circuit) chip) and is a technology that uses individual differences that occur in the manufacturing process of IC chips, etc. to identify individuals (IC chips) like human fingerprints, for example.

The above examples of the disclosure may be listed as following Supplementary notes (Notes), though not limited thereto.

(Note 1) A digital signature system includes a first processing apparatus that comprises at least a processor and a communication interface.

The first processing apparatus performs processing comprising:

receiving a first parameter generated using a first signing key and first biometric information to store the first parameter;

receiving a second parameter generated using a second signing key and second biometric information to calculate a key difference between the first signing key and the second signing key from the first parameter and the second parameter; and calculating a value corresponding to a difference between the first biometric information and the second biometric information using the first parameter, the second parameter, and the key difference to verify whether or not the value satisfies a predetermined specified condition.

(Note 2)

A digital signature system includes a second processing apparatus that comprises at least a processor and a communication interface.

The second processing apparatus performs processing comprising:

acquiring a second biometric information, receiving a second parameter generated using a differential key and a first parameter to generate a second signing key from the second parameter and the second biometric information; and calculating a value corresponding a difference between first biometric information and the second biometric information using the second parameter, the second biometric information and the second signing key to verify whether or not the value satisfies a specified condition.

(Note 3)

In the digital signature system described in Note 2, the second processing apparatus, further performs processing comprising:

obtaining a message to be signed; and after confirming that the difference between the first biometric information and the second biometric information satisfies the specified condition, generating a second signature for the message by the second signing key.

(Note 4)

In the digital signature system described in Note 1,the first processing apparatus, further performs processing comprising:

receiving a first verification key corresponding to the first signing key to store in a storage part;

receiving a signature for a message to be signed with the second signing key, a second verification key corresponding to the second signing key, and the message;

verifying the signature for the message using the second verification key; and verifying whether or not a first relation between the key difference and the first verification key and the second verification key corresponds to a second relation between a signing key and a verification key in a signing algorithm, the key difference being a difference between the first signing key and the second signing key.

(Note 5)

The digital signature system described in Note 4, further includes a second processing apparatus that comprises at least a processor and a communication interface and is connected to communicate to the first processing apparatus.

The second processing apparatus performs processing comprising:

acquiring the second biometric information and the message;

generating the second signing key and the second verification key corresponding to the second signing key;

generating the second parameter using the second signing key and the second biometric information;

generating the signature for the message with the second signing key; and transmitting the message, the second parameter, the second verification key, and the signature to the first processing apparatus.

(Note 6)

The digital signature system described in Note 3, further includes a first processing apparatus that comprises at least a processor and a communication interface and is connected to communicate to the second processing apparatus. The first processing apparatus performs processing comprising:

receiving the first parameter generated using a first signing key and the first biometric information to store in a storage part;

generating the differential key;

generating the second parameter from the differential key and the first parameter to transmit the second processing apparatus; and calculating a first signature when the message is signed with the first signing key, using the second signature and the differential key.

(Note 7)

The digital signature system described in Note 5, further includes a third processing apparatus that comprises at least a third processor and aa third communication interface and is connected to communicate to the first processing apparatus.

The third processing apparatus performs processing comprising:

acquiring the first biometric information;

generating the first signing key and the first verification key corresponding to the first signing key;

generating the first parameter using the first signing key and the first biometric information; and transmitting the first parameter to the first processing apparatus and transmitting the first verification key to the first processing apparatus or a key server.

(Note 8)

The digital signature system described in Note 6, further includes a third processing apparatus and a fourth processing apparatus each comprising at least a processor and a communication interface.

The third processing apparatus is connected to communicate to the fourth processing apparatus that is connected to communicate to the first processing apparatus and is connected to communicate to the first processing apparatus.

The third processing apparatus performs processing comprising:

acquiring the first biometric information;

generating the first signing key and a first verification key corresponding to the first signing key; and generating the first parameter using the first signing key and the first biometric information, transmitting the first parameter to the first processing apparatus and transmitting the first verification key to the fourth processing apparatus or a key server.

The fourth processing apparatus performs processing comprising:

receiving the first verification key generated by the third processing apparatus to store in a storage part;

receiving the message and the first signature from the first processing apparatus; and verifying the first signature for the message using the first verification key.

(Note 9)

In the digital signature system described in Note 7,the third processing apparatus, further performs processing comprising generating the first parameter using an encoded key obtained by encoding the first signing key, and the first biometric information.

The second processing apparatus, further performs processing comprising generating the second parameter using an encoded key obtained by encoding the second signing key, and the second biometric information.

(Note 10)

In the digital signature system described in Note 8, the third processing apparatus, further performs processing comprising generating the first parameter using an encoded key obtained by encoding the first signing key, and the first biometric information.

The first processing apparatus, further performs processing comprising generating the second parameter using an encoded key obtained by encoding the differential key, and the first parameter.

(Note 11)

In the digital signature system described in Note 1 or 2, the specified condition is a condition regarding a norm of the difference between the first biometric information and the second biometric information.

(Note 12)

In the digital signature system described in Note 11, the norm is $L^2$ norm.

(Note 13)

A digital signature method, includes:

receiving, by a first node, a first parameter generated using a first signing key and first biometric information to store in a storage part;

receiving, by the first node, a second parameter being generated using a second signing key and second biometric information to calculate a key difference between the first signing key and the second signing key from the first parameter and the second parameter; and calculating, by the first node, a value corresponding to a difference between the first biometric information and the second biometric information using the first parameter, the second parameter, and the key difference to verify whether or not the value satisfies a predetermined specified condition.

(Note 14)

A digital signature method, includes:

acquiring, by a second node, a second biometric information, receiving, by the second node, a second parameter generated using a differential key and a first parameter to generate a second signing key from the second parameter and the second biometric information; and calculating, by the second node, a value corresponding to a difference between first biometric information and the second biometric information using the second parameter, the second biometric information and the second signing key to verify whether or not the value satisfies a specified condition.

(Note 15)

In the digital signature method described in Note 14, comprising:

acquiring, by the second node, a message to be signed; and after confirming that the difference between the first biometric information and the second biometric information satisfies the specified condition, generating, by the second node, a second signature for the message with the second signing key.

(Note 16)

In the digital signature method described in Note 13, comprising:

receiving, by the first node, a first verification key corresponding to the first signing key to store in a storage part;

receiving, by the first node, a signature for a message to be signed with the second signing key, a second verification key corresponding to the second signing key, and the message;

verifying, by the first node, the signature for the message using the second verification key; and verifying, by the first node, whether or not a first relation between the key difference and the first verification key and the second verification key corresponds to a second relation between a signing key and a verification key in a signing algorithm, the key difference being a difference between the first signing key and the second signing key.

(Note 17)

The digital signature method described in Note 16, comprising:

acquiring, by the second node, the second biometric information and the message;

generating, by the second node, the second signing key and the second verification key corresponding to the second signing key;

generating, by the second node, the second parameter using the second signing key and the second biometric information;

generating, by the second node, the signature for the message with the second signing key; and transmitting, by the second node, the message, the second parameter, the second verification key, and the signature to the first processing apparatus.

(Note 18)

In the digital signature method described in Note 15, comprising:

after confirming that the difference between the first biometric information and the second biometric information satisfies the specified condition, generating, by the second node, a second signature for the message with the second signing key for transmission to the first node; and calculating, by the first node, a first signature when the message is signed with the first signing key, using the second signature and the differential key.

(Note 19)

The digital signature method described in Note 15, comprising generating, by a third node, the first signing key and the first verification key corresponding to the first signing key;

generating, by the third node, the first parameter using the first signing key and the first biometric information; and transmitting, by the third node, the first parameter to the first processing apparatus and transmitting the first verification key to the first processing apparatus or a key server.

(Note 20)

The digital signature method described in Note 18, comprising:

acquiring, by a third node, the first biometric information;

generating, by the third node, the first signing key and a first verification key corresponding to the first signing key;

generating, by the third node, the first parameter using the first signing key and the first biometric information, transmitting the first parameter to the first node;

transmitting, by the third node, the first verification key to the fourth node or a key server.

receiving, by a fourth node, the first verification key generated by the third node to store in a storage;

receiving, by the fourth node, the message and the first signature from the first node; and verifying, by the fourth node, the first signature for the message using the first verification key.

(Note 21)

In the digital signature method described in Note 19, comprising generating, by the third node, the first parameter using an encoded key, in which the first signing key is error correction encoded, and the first biometric information; and generating, by the first node, the second parameter using an encoded key, in which the differential key is error correction encoded, and the first biometric information.

(Note 22)

In the digital signature method described in Note 20, comprising:

generating, by the third node, the first parameter using an encoded key obtained by encoding the first signing key, and the first biometric information; and generating, by the first node, the second parameter using an encoded key obtained by encoding the differential key, and the first parameter.

(Note 23)

In the digital signature method described in Note 13 or 14, wherein the specified condition is a condition regarding a norm of the difference between the first biometric information and the second biometric information.

(Note 24)

In the digital signature method described in Note 23, wherein the norm is $L^2$ norm.

(Note 25)

A processing apparatus includes at least a processor and a communication interface, wherein the processing apparatus performs processing comprising:

receiving a first parameter generated using a first signing key and first biometric information to store the first parameter;

receiving a second parameter generated using a second signing key and second biometric information to calculate a key difference between the first signing key and the second signing key from the first parameter and the second parameter; and calculating a value corresponding to a difference between the first biometric information and the second biometric information using the first parameter, the second parameter, and the key difference to verify whether or not the value satisfies a predetermined specified condition.

(Note 26)

A processing apparatus includes at least a processor and a communication interface, wherein the processing apparatus performs processing comprising:

acquiring a second biometric information, receiving a second parameter generated using a differential key and a first parameter to generate a second signing key from the second parameter and the second biometric information; and calculating a value corresponding to a difference between first biometric information and the second biometric information using the second parameter, the second biometric information and the second signing key to verify whether or not the value satisfies a specified condition.

(Note 27)

A non-transitory medium storing a program causing a first processing apparatus that comprises at least a processor and a communication interface to execute processing comprising:

receiving a first parameter generated using a first signing key and first biometric information to store the first parameter;

receiving a second parameter generated using a second signing key and second biometric information to calculate a key difference between the first signing key and the second signing key from the first parameter and the second parameter; and calculating a value corresponding to a difference between the first biometric information and the second biometric information using the first parameter, the second parameter, and the key difference to verify whether or not the value satisfies a predetermined specified condition.

(Note 28)

A non-transitory medium storing a program causing a second processing apparatus that comprises at least a processor and a communication interface to execute processing comprising:

acquiring a second biometric information, receiving a second parameter generated using a differential key and a first parameter to generate a second signing key from the second parameter and the second biometric information; and calculating a value corresponding to a difference between first biometric information and the second biometric information using the second parameter, the second biometric information and the second signing key to verify whether or not the value satisfies a specified condition.

The disclosure of each of PTLs 1 and 2, and NPLs 1 and 2 is incorporated herein by reference thereto. Variations and adjustments of the examples are possible within the scope of the overall disclosure (including the claims) based on the basic technical concept. Various combinations and selections of examples and disclosed elements (including the elements in each of the claims, examples, drawings, etc.) are possible within the scope of the claims of the present application. That is, the present disclosure includes various variations and modifications that could be made by those skilled in the art according to the overall disclosure including the claims and the technical concept.

What is claimed is:

1. A digital signature system comprising:

a first processing apparatus that includes at least a first processor, a first memory storing program instructions executable by the first processor, and a first communication interface; and a second processing apparatus that includes at least a second processor, a second memory storing program instructions executable by the second processor, and a second communication interface to communicatively connect with at least the first communication interface of the first processing apparatus;

the first processing apparatus and the second processing apparatus configured to implement a digital signature scheme using biometrics, wherein the first processing apparatus or the second processing apparatus is configured to execute the program instructions to perform processing comprising:

based on a first parameter which is generated using a first signing key and first biometric information, and a second parameter which is generated using a second signing key and second biometric information or generated using at least the first parameter, calculating a value corresponding to a difference between the first biometric information and the second biometric information; and verifying whether or not the value satisfies a predetermined specified condition, wherein the first processing apparatus is configured to execute the program instructions to perform processing comprising:

receiving the first parameter to store the first parameter in a storage;

receiving the second parameter generated using the second signing key and the second biometric information;

calculating a key difference between the first signing key and the second signing key, using the first parameter and the second parameter; and calculating the value corresponding to the difference between the first biometric information and the second biometric information, using the first parameter, the second parameter, and the key difference to verify whether or not the value satisfies the predetermined specified condition.

2. The digital signature system according to claim 1, wherein the first processing apparatus is configured to execute the program instructions to perform processing comprising:

receiving a first verification key corresponding to the first signing key to store the first verification key in the storage;

receiving a signature for a message generated using the second signing key, a second verification key corresponding to the second signing key, and the message;

verifying validity of the signature for the message, using the second verification key; and verifying whether or not a relation among the key difference between the first signing key and the second signing key and the first verification key and the second verification key, conforms to a relation between a signing key and a verification key in a corresponding signing algorithm.

3. The digital signature system according to claim 2, wherein the second processing apparatus is configured to perform processing comprising:

acquiring the second biometric information and the message;

generating the second signing key and the second verification key corresponding to the second signing key;

generating the second parameter using the second signing key and the second biometric information;

generating the signature for the message with the second signing key; and transmitting the message, the second parameter, the second verification key, and the signature to the first processing apparatus.

4. The digital signature system according to claim 3, further comprising a third processing apparatus that includes at least a processor, a third memory storing a program executable by the third processor, and a third communication interface to communicate with at least the first communication interface of the first processing apparatus, wherein the third processing apparatus is configured to:

acquiring the first biometric information;

generating the first signing key and the first verification key corresponding to the first signing key;

generating the first parameter using the first signing key and the first biometric information; and transmitting the first parameter to the first processing apparatus and transmit the first verification key to the first processing apparatus or a key server.

5. The digital signature system according to claim 4, wherein the third processing apparatus is further configured to perform processing comprising:

generating the first parameter, using an encoded key obtained by encoding the first signing key, and the first biometric information, wherein the second processing apparatus is further configured to perform processing comprising generating the second parameter, using an encoded key obtained by encoding the second signing key, and the second biometric information.

6. The digital signature system according to claim 1, wherein the specified condition is a condition regarding a norm of the difference between the first biometric information and the second biometric information.

7. The digital signature system according to claim 6, wherein the norm is L2 norm.

8. A digital signature system comprising:

a first processing apparatus that includes at least a first processor, a first memory storing program instructions executable by the first processor, and a first communication interface; and a second processing apparatus that includes at least a second processor, a second memory storing program instructions executable by the second processor, and a second communication interface to communicatively connect with at least the first communication interface of the first processing apparatus;

the first processing apparatus and the second processing apparatus configured to implement a digital signature scheme using biometrics, wherein the first processing apparatus or the second processing apparatus is configured to execute the program instructions to perform processing comprising:

based on a first parameter which is generated using a first signing key and first biometric information, and a second parameter which is generated using a second signing key and second biometric information or generated using at least the first parameter, calculating a value corresponding to a difference between the first biometric information and the second biometric information; and verifying whether or not the value satisfies a predetermined specified condition, wherein the second processing apparatus is configured to execute the program instructions to perform processing comprising:

acquiring the second biometric information, receiving the second parameter generated using a differential key and the first parameter;

generating a second signing key, using the second parameter and the second biometric information; and calculating the value corresponding to the difference between first biometric information and the second biometric information, using the second parameter, the second biometric information and the second signing key to verify whether or not the value satisfies a predetermined specified condition.

9. The digital signature system according to claim 8, wherein the second processing apparatus is configured to execute the program instructions to perform processing comprising:

obtaining a message which is a signature target; and after confirming that the difference between the first biometric information and the second biometric information satisfies the predetermined specified condition, generating a second signature for the message using the second signing key.

10. The digital signature system according to claim 9, wherein the first processing apparatus is configured to execute the program instructions to perform processing comprising:

receiving the first parameter generated using the first signing key and the first biometric information to store the first parameter in a storage;

generating the differential key;

generating the second parameter using the differential key and the first parameter;

transmitting the second parameter to the second processing apparatus; and obtaining a first signature for the message using the second signature and the differential key, the first signature for the message corresponding to a signature for the message generated using the first signing key.

11. The digital signature system according to claim 10, further comprising:

a third processing apparatus and a fourth processing apparatus, each comprising at least a processor, a memory storing program instructions executable by the processor and a communication interface, the third processing apparatus communicatively connects with the fourth processing apparatus that communicatively connects with the first processing apparatus, the third processing apparatus communicatively connecting with the first processing apparatus, wherein the third processing apparatus is configured to execute the program instructions to perform processing comprising:

acquiring the first biometric information;

generating the first signing key and a first verification key corresponding to the first signing key; and generating the first parameter using the first signing key and the first biometric information, transmitting the first parameter to the first processing apparatus; and transmitting the first verification key to the fourth processing apparatus or a key server, and wherein the fourth processing apparatus is configured to execute the program instructions to perform processing comprising:

receiving the first verification key generated by the third processing apparatus to store the first verification key in a storage;

receiving the message and the first signature from the first processing apparatus; and verifying the first signature for the message, using the first verification key.

12. The digital signature system according to claim 11, wherein the third processing apparatus is further configured to perform processing comprising:

generating the first parameter using an encoded key obtained by encoding the first signing key, and the first biometric information, and wherein the first processing apparatus is further configured to generating the second parameter using an encoded key obtained by encoding the differential key, and the first parameter.

13. A digital signature method in which a digital signature scheme using biometrics is implemented at least by a first node and a second node, the method comprising:

calculating, by one of the first node and the second node, a value corresponding to a difference between first biometric information and second biometric information, based on a first parameter which is generated using a first signing key and the first biometric information, and a second parameter which is generated using a second signing key and the second biometric information or generated using at least the first parameter; and verifying, by the one of the first node and the second node, whether or not the value satisfies a predetermined specified condition, wherein in a case where the first node performs the calculating and the verifying, the method comprises, by the first node:

receiving the first parameter to store the first parameter in a storage;

receiving the second parameter generated using the second signing key and the second biometric information;

calculating a key difference between the first signing key and the second signing key, using the first parameter and the second parameter; and calculating the value corresponding to the difference between the first biometric information and the second biometric information, using the first parameter, the second parameter, and the key difference; and verifying whether or not the value satisfies the predetermined specified condition, and wherein in a case where the second node performs the calculating and the verifying, the method comprises, by the second node:

acquiring the second biometric information, receiving the second parameter generated using a differential key and the first parameter;

generating a second signing key using the second parameter and the second biometric information;

calculating the corresponding to the difference between first biometric information and the second biometric information, using the second parameter, the second biometric information and the second signing key; and verifying whether or not the value satisfies the predetermined specified condition.

* * * * *